(12) United States Patent
Schmieg et al.

(10) Patent No.: US 8,466,083 B2
(45) Date of Patent: *Jun. 18, 2013

(54) BI-FUNCTIONAL CATALYST MATERIALS FOR LEAN EXHAUST $NO_x$ REDUCTION

(75) Inventors: Steven J. Schmieg, Troy, MI (US); Gongshin Qi, Troy, MI (US); Wei Li, Troy, MI (US); Chang H Kim, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 250 days.

This patent is subject to a terminal disclaimer.

(21) Appl. No.: 12/870,349

(22) Filed: Aug. 27, 2010

(65) Prior Publication Data

US 2012/0047874 A1 Mar. 1, 2012

(51) Int. Cl.
*F01N 3/00* (2006.01)
(52) U.S. Cl.
USPC .............................. 502/303; 502/324; 422/171
(58) Field of Classification Search
USPC .................................. 502/303, 324; 422/171
See application file for complete search history.

(56) References Cited

U.S. PATENT DOCUMENTS

| | | | | |
|---|---|---|---|---|
| 5,419,123 A | * | 5/1995 | Masters | 60/274 |
| 5,879,645 A | * | 3/1999 | Park et al. | 423/213.2 |
| 6,103,207 A | * | 8/2000 | Chattha et al. | 423/213.2 |
| 6,919,047 B1 | * | 7/2005 | He et al. | 422/122 |
| 2003/0180196 A1 | * | 9/2003 | Gillespie et al. | 422/168 |
| 2008/0292519 A1 | | 11/2008 | Caudle et al. | |
| 2010/0236224 A1 | * | 9/2010 | Kumar et al. | 60/297 |

FOREIGN PATENT DOCUMENTS

EP  658368  *  6/1995

OTHER PUBLICATIONS

Zhu et al., The Reaction and Poisoning Mechanism of SO2 and Perovskite LaCoO3 Film Model Catalysts; Applied Catalysis A: General 209 (2001) pp. 71-77.
Cheng et al., Stability of Materials as Candidates for Sulfur-Resistant Anodes of Solid Oxide Fuel Cells; Journal of the Electrochemical Society, 153 (7), 2006, pp. A1302-A1309.
Wang et al., Study on the Poisoning Mechanism of Sulfur Dioxide for Perovskite La0.9Sr0.1CoO3 Model Catalysts; Catalysis Letters, vol. 82, No. 3-4, Oct. 2002, pp. 199-204.
Alifanti et al., Activity in Methane Combustion and Sensitivity to Sulfur Poisoning of La1-xCexMn1-yCoyO3 Perovskite Oxides, Applied Catalysis B: Environmental 41 (2003), pp. 71-81.

(Continued)

*Primary Examiner* — Steven Bos
(74) *Attorney, Agent, or Firm* — BrooksGroup

(57) ABSTRACT

A bi-functional catalyst material, a SCR converter that includes the bi-functional catalyst material, an exhaust aftertreatment system that includes the SCR converter, and a method for removing $NO_X$ contained in an exhaust flow produced by a lean-burn engine are disclosed. The bi-functional catalyst material can (1) oxidize NO to $NO_2$ and (2) selectively reduce $NO_X$ to $N_2$ when exposed to an exhaust mixture that comprises the exhaust flow from the lean-burn engine and a suitable reductant. The bi-functional catalyst material comprises metal oxide particles selected from the group consisting of perovskite oxide particles and manganese-based mixed metal oxide particles dispersed on a selective catalytic reduction (SCR) catalyst.

14 Claims, 9 Drawing Sheets

OTHER PUBLICATIONS

Tanaka et al., Advances in Designing Perovskite Catalysts; Current Opinion in Solid State and Materials Science, vol. 5, 2001, pp. 381-387.

U.S. Appl. No. 12/571,606, filed Oct. 1, 2009, Washcoating Technique for Perovskite Catalyst, Chang H. Kim.

U.S. Appl. No. 12/563,345, filed Sep. 21, 2009, Method and Architecture for Oxidizing Nitric Oxide in Exhaust Gas From Hydrocarbon Fuel Source With a Fuel Lean Combustion Mixture, Chang H. Kim.

U.S. Appl. No. 12/720,158, filed Mar. 9, 2010, Sulfur Tolerant Perovskite Supported Catalysts, Chang H. Kim.

U.S. Appl. No. 12/713,803, filed Feb. 26, 2010, Perovskite-Type Compounds for Use in Lean NOx Traps, Wei Li.

U.S. Appl. No. 12/860,180, filed Aug. 20, 2010, Catalyst Materials for Ammonia Oxidation in Lean-Burn Engine Exhaust, Steven J. Schmieg et al.

* cited by examiner ic field relates generally to exhaust aftertreatment systems that treat the exhaust produced by a lean-burn engine and, more particularly, to catalyst materials that may be used to help remove $NO_X$.

BI-FUNCTIONAL CATALYST MATERIALS FOR LEAN EXHAUST $NO_X$ REDUCTION

TECHNICAL FIELD

The technical field relates generally to exhaust aftertreatment systems that treat the exhaust produced by a lean-burn engine and, more particularly, to catalyst materials that may be used to help remove $NO_X$.

BACKGROUND

Lean-burn engines are supplied with, and combust, a lean mixture of air and fuel (oxygen-rich mixture) to achieve more efficient fuel economy. Some notable examples of lean-burn engines include charge compression-ignition (diesel) engines, certain spark-ignition (gasoline) engines such as spark-ignition direct injection (SIDI) engines, and homogeneous charge compression ignition (HCCI) engines. These and other types of lean-burn engines are generally more fuel efficient than conventional rich-burn spark-ignition engines as a result of thermal efficiency gains related to, among other factors, decreases in throttle and heat losses.

The exhaust emitted from a lean-burn engine during periods of lean-burn operation may include a relatively high content of nitrogen ($N_2$) and oxygen ($O_2$), a relatively low content of carbon monoxide (CO) and unburned/partially-burned hydrocarbons (HC's), possibly some suspended particulate matter (i.e., in diesel engines), and small amounts of nitrogen oxides primarily comprised of NO and $NO_2$ (collectively referred to as $NO_X$). The $NO_X$ constituency of the exhaust may fluctuate between about 50 and about 1500 ppm and may comprise greater than 90 mol % NO and less than 10 mol % $NO_2$ along with nominal amounts of $N_2O$. The hot engine exhaust, which can reach temperatures of up to about 900° C., often needs to be treated to decrease the concentration of CO, HC's, $NO_X$, and particulate suspensions before it can be released to the atmosphere.

An exhaust aftertreatment system may be configured downstream of a lean-burn engine to manage any unwanted gaseous emissions and possible particulate matter contained in the engine's exhaust. A typical exhaust aftertreatment system usually aspires to cooperatively (1) oxidize CO into carbon dioxide ($CO_2$), (2) oxidize HC's into $CO_2$ and water ($H_2O$), (3) convert $NO_X$ gases into nitrogen ($N_2$) and $O_2$, and (4) filter off or otherwise destroy any suspended particulate matter. A variety of exhaust aftertreatment system architectures that employ specially-catalyzed components have been devised and are able to sufficiently facilitate these reactions so that the exhaust expelled to the environment contains a much more desirable chemical makeup. The various components that make up the exhaust aftertreatment system may vary depending on, among other factors, the type of lean-burn engine being operated.

A SIDI engine, for example, may be connected to a catalytic converter that houses a three-way-catalyst comprised of platinum group metals (PGM's) such as platinum, palladium, and rhodium. Catalytic converters have long been used in conventional spark-ignition gasoline engines that combust a near-stoichiometric mixture of air and fuel to remove unwanted CO, HC's, and $NO_X$ from the engine's exhaust. But the nature of the exhaust produced from a SIDI engine during periods of lean-burn operation poses certain challenges with regard to $NO_X$ removal. One specific challenge is that the relatively high content of $O_2$ and the relatively low content of CO and HC's in the hot exhaust renders the reaction kinetics for the conversion of $NO_X$ to $N_2$ over PGM's quite unfavorable. As another example, a diesel engine may be connected to a diesel particulate filter and a diesel oxidation convertor that houses a diesel oxidation catalyst comprised of PGM's such as platinum and palladium. The diesel particulate filter and the diesel oxidation convertor can remove unwanted CO, HC's, and suspended particulates but, much like catalytic converters, are generally not suitable for removing $NO_X$ due to relatively high $O_2$ concentrations. Additional measures are therefore generally incorporated into the exhaust aftertreatment systems of both SIDI and diesel engines, and all other types of lean-burn engines, to help remove $NO_X$.

One available option that may be employed in an exhaust aftertreatment system of a lean-burn engine to help convert $NO_X$ to $N_2$ is a selective catalyst reduction (SCR) catalyst. The SCR catalyst may be washcoated onto a support substrate located in the flow path of the exhaust. A reductant, such as a hydrocarbon or ammonia ($NH_3$), may be introduced into and mixed with the exhaust expelled from the lean-burn engine upstream of the SCR catalyst. The reductant, once exposed to the SCR catalyst, selectively reduces NO to $N_2$ in the presence of $O_2$. The SCR catalyst may be positioned in the exhaust aftertreatment system downstream of an oxidation catalyst that oxidizes NO to $NO_2$ in more than nominal quantities. This positioning of the SCR catalyst may be quite helpful since the SCR catalyst generally converts $NO_X$ to $N_2$ more efficiently, especially at lower temperatures, as the molar ratio of NO to $NO_2$ decreases from that which is originally generated by the lean-burn engine to a ratio of about 1.

Conventional diesel oxidation catalysts and two-way-catalysts are generally able to sufficiently affect the molar ratio of NO to $NO_2$ in the $NO_X$ fed to the SCR converter. Conventional three-way-catalysts, however, generally possess a limited NO oxidation capability due to a lesser proportional platinum loading. As a result, to help maximize $NO_X$ conversion, an exhaust aftertreatment system for a diesel engine may simply position the SCR converter downstream of the diesel oxidation converter and an exhaust aftertreatment system for a SIDI engine may further incorporate a diesel oxidation catalyst or some other suitable two-way-catalyst upstream of the SCR converter. But the PGM's commonly used to make the oxidation catalyst for NO oxidation, most notably platinum, are quite expensive and have been shown, in some instances, to exhibit poor thermal durability when exposed to relatively high-temperature engine exhaust.

The use of a SCR converter in the exhaust aftertreatment system for a lean-burn engine is thus an attractive, yet challenging, option for removing $NO_X$ from the engine's exhaust. Such a device is often paired with an upstream oxidation catalyst to help boost $NO_X$ conversion at low-temperatures. Conventional oxidation catalysts, however, primarily contain expensive and insufficiently durable PGM's. SCR technology related to $NO_X$ removal is thus constantly in need of innovative developments and contributions that can help advance to this and other related fields of technological art.

SUMMARY OF EXEMPLARY EMBODIMENTS

An exhaust aftertreatment system for a lean-burn engine may include a bi-functional catalyst material that (1) oxidizes NO to $NO_2$ and (2) selectively reduces $NO_X$ to $N_2$ when exposed to an exhaust mixture that comprises an exhaust flow from the lean-burn engine and a reductant. The bi-functional catalyst material may comprise metal oxide particles dispersed on a selective catalytic reduction (SCR) catalyst. The metal oxide particles may be selected from the group consisting of perovskite oxide particles and manganese-containing mixed metal oxide particles. The bi-functional catalyst material may be included in a SCR converter or any other component that forms part of the exhaust aftertreatment system. Other exemplary and more detailed embodiments of the invention will become apparent from the detailed description that follows.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

Figure 1:
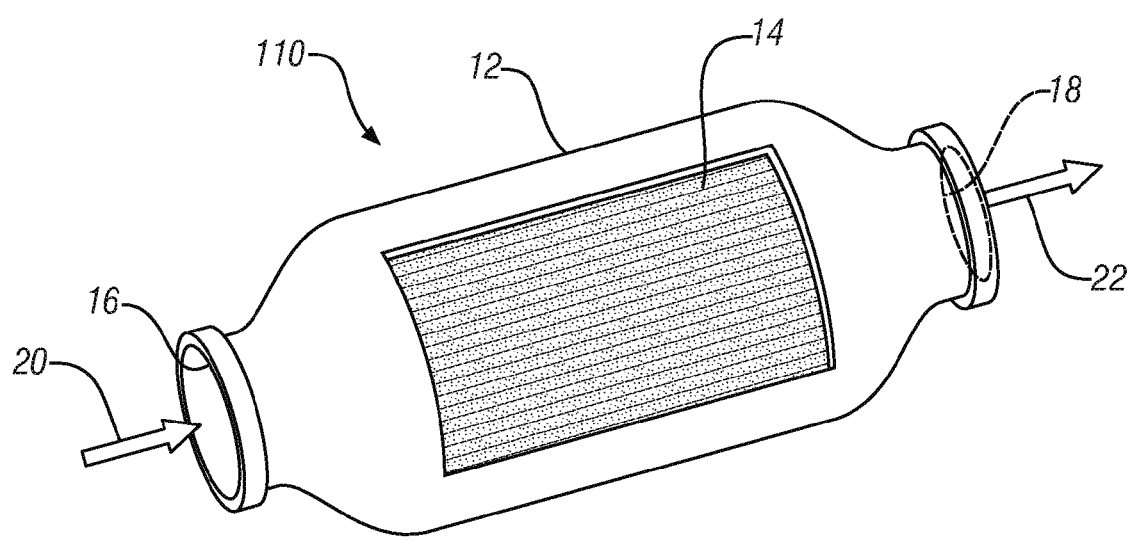
FIG. 1 is a generalized and schematic depiction of a SCR converter that includes a bi-functional catalyst material.

The following description is merely exemplary in nature and is in no way intended to limit the claimed invention(s), its application, or its uses.

A bi-functional catalyst material has been developed that can (1) oxidize NO to $NO_2$ and (2) selectively reduce $NO_X$ to $N_2$ when exposed to an exhaust mixture that comprises a hot, oxygen-abundant exhaust flow emanated from a lean-burn engine mixed with a suitable reductant. The bi-functional catalyst material comprises metal oxide particles selected from the group consisting of perovskite oxide particles and manganese-containing mixed metal oxide particles dispersed on a selective catalytic reduction (SCR) catalyst. The metal oxide particles are generally responsible for oxidizing NO to $NO_2$ and the SCR catalyst is generally responsible for reducing $NO_X$ (both NO and $NO_2$) to $N_2$ in the presence of the reductant. This is not to say, however, that the catalytic functions of the metal oxide particles and the SCR catalyst are mutually exclusive. There may very well be some overlap in catalytic function (NO oxidation and $NO_X$ reduction) and/or some synergistic effects attributed to the metal oxide particles and the SCR catalyst when included in the bi-functional catalyst material.

The bi-functional catalyst material may be employed in a SCR converter or other component that forms part of an exhaust aftertreatment system for a lean-burn engine such as, but not limited to, a charge compression-ignition (diesel) engine, a lean-burn spark-ignition (gasoline) engine such as spark-ignition direct injection (SIDI) engine, or a homogeneous charge compression ignition (HCCI) engine. Any reference in this disclosure to the exhaust produced by the lean-burn engine, unless otherwise specified, refers to exhaust generated from the combustion of a lean-mixture of air and fuel. The exact concentration of the various emissions ($NO_X$, CO, HC's) in the exhaust produced by the lean-burn engine may vary depending on a variety of factors.

The bi-functional catalyst material may contribute to significant cost savings in the design and construction of the exhaust aftertreatment system. The duel catalytic activity of the bi-functional catalyst material, for instance, can help improve the low-temperature $NO_X$ conversion efficiency of the SCR converter without having to rely principally on an upstream oxidation catalyst to affect the molar feed ratio of NO to $NO_2$. The bi-functional catalyst material may further oxidize some of the CO and HC's contained in the exhaust mixture to help lower the catalytic demand on a downstream diesel oxidation catalyst or three-way-catalyst, if present. Such an attribute may allow any downstream diesel oxidation catalyst or three-way-catalyst to include a smaller amount of PGM's than is conventionally warranted since only residual CO and HC's not removed by the bi-functional catalyst material may need to be oxidized. The option to forego an upstream oxidation catalyst and the reduced PGM catalyst loading of any downstream diesel oxidation and three-way-catalysts may decrease the overall catalyst volume and the amount of expensive PGM's used in the exhaust aftertreatment system when compared to similar conventional systems. A reduction in catalyst volume can further minimize the size requirements of the exhaust aftertreatment system which, for vehicle applications, may contribute to more compact and/or flexible packaging. The bi-functional catalyst material has also shown an ability to retain its catalytic activity over time despite the aging. It is believed that the presence of the metal oxide particles contributes to this quality.

FIG. 1 depicts, as one embodiment, a generalized and schematic illustration of a SCR converter 110 that includes the bi-functional catalyst material. The SCR converter 110 may be included in an exhaust aftertreatment system to help remove $NO_X$ emissions from an exhaust mixture 20. The exhaust mixture 20 may comprise an exhaust flow produced by a lean-burn engine (not shown) and a suitable reductant that has been introduced into and mixed with the exhaust flow. The molar ratio of NO to $NO_2$ in the exhaust mixture may be substantially unchanged (+/−5%) from that originally produced by the lean-burn engine if the exhaust flow has not traversed an upstream oxidation catalyst with a significant platinum loading such as, for example, a conventional diesel oxidation catalyst. The SCR converter 110 may include a housing 12 that encloses a substrate body 14 to which the bi-functional catalyst material is adhered.

The housing 12 may define an inlet 16 and an outlet 18. The inlet 16 receives the exhaust mixture 20 and the outlet 18 delivers a $NO_X$-treated exhaust mixture 22 downstream of the SCR converter 110. The housing 12 may be configured to communicate the exhaust mixture 20 from the inlet 16 to the outlet 18 and across the substrate body 14 to induce intimate exposure between the exhaust mixture 20 and the bi-functional catalyst material. The substrate body 14 may be formed from a material capable of withstanding the temperatures and chemical environment associated with the exhaust mixture 20. Some specific examples of materials that may be used include ceramics such as extruded cordierite, α-alumina, silicon carbide, silicon nitride, zirconia, mullite, spodumene, alumina-silica-magnesia, zirconium silicate, sillimanite, petalite, or a heat and corrosion resistant metal such as titanium or stainless steel.

Various constructions of the substrate body 14 are possible. The substrate body 14 may, in one embodiment, be a monolithic honeycomb structure that includes hundreds of parallel flow-through cells per square inch extending through the substrate body 14. Each of the flow-through cells may be defined by a wall surface to which the bi-functional catalyst material is adhered. The substrate body 14 may, in another embodiment, be a packed bed comprised of many beads or pellets. And much like the monolithic honeycomb structure, the bi-functional catalyst material may be adhered onto the surface of the closely-packed beads or pellets.

Any suitable reductant may be used in conjunction with the bi-functional catalyst material to reduce $NO_X$ to $N_2$ such as, for example, ammonia, a hydrocarbon, or an oxygenated hydrocarbon. The reductant may be introduced into and mixed with the exhaust flow to form the exhaust mixture 20 upstream of the bi-functional catalyst material by any appropriate method.

Ammonia, for example, may be injected into the exhaust flow from an on-board and refillable storage tank or, alternatively, it may be passively generated from native $NO_X$ over a close-coupled TWC catalyst during periodic moments when the lean-burn engine combusts a rich mixture of air and fuel. A more complete discussion of passive ammonia generation can be found in commonly assigned U.S. Pat. Application Publication No. 2010/0043402. Ammonia may also be introduced into the exhaust flow by injecting an ammonia-cleaving compound, such as urea, into the exhaust flow from an on-board and refillable storage tank. Urea may be used as the ammonia-cleaving compound since it readily undergoes thermolysis and hydrolysis reactions to form ammonia in the hot, oxygen-abundant environment associated with the exhaust flow produced by the lean-burn engine.

The same general methods are also available to introduce a hydrocarbon and/or an oxygenated hydrocarbon into the exhaust flow. Standard gasoline or diesel fuel derived hydrocarbons such as alkanes ranging from propane to dodecane, for example, may be introduced into the exhaust flow by momentarily delivering a rich mixture of air and fuel to the lean-burn engine so that uncombusted fuel is contained in the exhaust flow. Hydrocarbons may also be introduced into the exhaust flow by directing a portion of the gasoline or diesel fuel around the lean-burn engine, reforming the fuel, and then injecting the reformed fuel into the exhaust flow. An oxygenated hydrocarbon such as, for example, formaldehyde, ethanol, or acetaldehyde, may be injected into the exhaust flow from an on-board and refillable storage tank. Oxygenated hydrocarbons may also be derived from uncombusted gasoline or diesel fuel present in the exhaust flow or from gasoline or diesel fuel that is circumvented around the lean-burn engine, reformed, and then injected into the exhaust flow. Several examples of methods in which hydrocarbons or oxygenated hydrocarbons are injected into the exhaust flow are described in commonly owned U.S. Pat. Nos. 7,093,429 and 6,957,528 and commonly owned U.S. Patent Application Publication 2008/0127634.

The perovskite oxide particles that may be dispersed on the SCR catalyst encompass a class of compounds defined by the general formula $ABO_3$. The "A" and "B" atoms may be complimentary cations of different sizes that coordinate with oxygen anions. A unit cell of the $ABO_3$ crystal structure may feature a cubic closest packing arrangement with the "A" cation, which is generally the larger of the two cations, centrally located and surrounded by eight "B" cations situated in the octahedral voids of the packing arrangement. The "A" and "B" cations in such a packing arrangement respectively coordinate with twelve and six oxygen anions. The unit cell of the $ABO_3$ crystal structure, however, is not necessarily limited to a cubic closest packing arrangement. Certain combinations of the "A" and "B" cations may indeed deviate from the cubic closest packing arrangement and assume, for instance, an orthorhombic, rhombohedral, or monoclinic packing structure. Small amounts of the "A" and/or "B" cations, moreover, may be substituted with different yet similarly sized "A1" and "B1" promoter cations to give a supercell crystal structure derived from the general $ABO_3$ crystal structure and designated by the general formula $A_{1-X}A1_XB_{1-Y}B1_YO_3$, where both X and Y range from 0 to 1.

The perovskite oxide particles may comprise the same perovskite oxide or a mixture of two or more perovskite oxides. A great many combinations of perovskite oxides are available for use in the bi-functional catalyst material since no fewer than 27 cations may be employed as the "A" cation and no fewer than 36 cations may be employed as the "B" cation. A listing of the cations most frequently employed as the "A"

cation includes those of calcium (Ca), strontium (Sr), barium (Ba), bismuth (Bi), cadmium (Cd), cerium (Ce), lead (Pb), yttrium (Y), and lanthanum (La) while a listing of the cations most commonly employed as the "B" cation includes those of cobalt (Co), titanium (Ti), zirconium (Zr), niobium (Nb), tin (Sn), cerium (Ce), aluminum (Al), nickel (Ni), chromium (Cr), manganese (Mn), copper (Cu), and iron (Fe). Some specific and exemplary perovskite oxides that may constitute all or part of the perovskite oxide particles include $LaCoO_3$, $La_{0.9}Sr_{0.1}CoO_3$, $LaMnO_3$, $La_{0.9}Sr_{0.1}MnO_3$, $LaFeO_3$, and $LaSr_{0.1}Fe_{0.9}O_3$.

The manganese-containing mixed metal oxide particles that may be dispersed on the SCR catalyst may include at least one of manganese-cerium oxides ($Mn_XCe_YO_Z$), manganese-zirconium oxides ($Mn_XZr_WO_Z$), or manganese-cerium-zirconium oxides ($Mn_XCe_YZr_WO_Z$), with X ranging from 0.02 to 0.98, Y ranging from 0.02 to 0.98, W ranging from 0.02 to 0.98, and Z ranging from 1.0 to 3.0. Some specific examples of suitable manganese-containing mixed metal oxides include, but are not limited to, $0.5MnO_V$-$0.5CeO_2$ where V ranges from 2 to 3, $0.3MnO_V$-$0.7CeO_2$ where V ranges from 2 to 3, $0.1MnO_V$-$0.9CeO_2$ where V ranges from 2 to 3, $Mn_{0.1}Ce_{0.9}O_2$, $Mn_{0.2}Ce_{0.8}O_{1.9}$, and $Mn_{0.5}Ce_{0.5}O_{1.75}$.

The perovskite oxide particles and the manganese-containing mixed metal oxide particles, either alone or in combination, can catalytically oxidize NO to $NO_2$ when exposed to the exhaust mixture 20 just as efficiently as platinum. While not wishing to be bound by theory, it is believed that the perovskite oxide and the manganese-containing mixed metal oxide particles donate oxygen anions to NO molecules to enable the formation of $NO_2$ while temporarily forming oxygen vacancies in their crystal structures. Readily available oxygen contained in the engine exhaust then disassociates to fill those oxygen anion vacancies and possibly oxidize additional NO molecules. The ability of the perovskite oxide and the manganese-containing mixed metal oxide particles to efficiently oxidize NO to $NO_2$ may significantly diminish or altogether eliminate the need to position PGM-based catalysts upstream of the bi-functional catalyst material as a mechanism to enhance the low-temperature $NO_X$ conversion efficiency of the SCR converter 110. The bi-functional catalyst material may, as a result, facilitate the design and construction of an exhaust aftertreatment system that demands less overall catalyst volume and a smaller amount of PGM's than a comparable exhaust aftertreatment system that situates a heavily platinum-loaded oxidation catalyst upstream from a conventional reductant-SCR converter.

The amount of the metal oxide particles present in the bi-functional catalyst material may range from about 0.1 wt. % to about 20 wt. %, more specifically from about 0.5 wt. % to about 15 wt. %, and even more specifically from about 1.0 wt. % to about 12 wt. %, based on the weight of the bi-functional catalyst material. The specific metal oxide particle loading may be chosen, if desired, based on the normal expected operating temperature window of the exhaust produced by the associated lean-burn engine and the aging of the bi-functional catalyst material. Higher metal oxide particle loadings tend to convert $NO_X$ to $N_2$ more efficiently at lower exhaust temperatures (up to about 350° C.) and, conversely, lower metal oxide particle loadings tend to convert $NO_X$ to $N_2$ more efficiently at higher exhaust temperatures (about 350° C. and greater). High-temperature aging can further affect the NO oxidation efficiency and the $N_2$ selectivity of the bi-functional catalyst material. Such aging, in general, improves the $N_2$ selectivity of the bi-functional catalyst at higher temperatures at the expense of NO oxidation efficiency at lower temperatures. Any appropriate technique may be used to disperse the metal oxide particles onto the SCR catalyst including washcoating and incipient wet impregnation.

The SCR catalyst may be any material that can facilitate the reduction of $NO_X$ to $N_2$ when exposed to the exhaust mixture 20. The SCR catalyst is generally a porous and high-surface area material—a wide variety of which are commercially available. The specific SCR catalyst used to formulate the bi-functional catalyst material may generally depend on several factors including the particular reductant selected to form the exhaust mixture 20. The SCR catalyst may, in one embodiment, be an ion-exchanged base metal zeolite or a base metal oxide if the reductant is ammonia. Some examples of suitable ion-exchanged base metal zeolites include, but are not limited to, a β-zeolite that is ion-exchanged with Cu or Fe and a MFI-type zeolite (i.e., ZSM-5) that is ion-exchanged with Cu or Fe. Some examples of suitable base metal oxides include, but are not limited to, $V_2O_5$—$WO_3/TiO_2$ and $V_2O_5/TiO_2$. In another embodiment, however, the SCR catalyst may be silver-supported alumina ($Ag/Al_2O_3$) or an ion-exchanged base metal zeolite if the reductant is a hydrocarbon or an oxygenated hydrocarbon. Some examples of suitable ion-exchanged base metal zeolites include, but are not limited to, Y-type zeolite that is ion-exchanged with a Na, Ba, Cu, or CuCo.

The particular composition of the bi-functional catalyst material may be formulated based on a number of factors including the type and normal expected operating parameters of the lean-burn engine, the particular reductant used, and the design and construction of the exhaust aftertreatment system that includes the bi-functional catalyst material. The bi-functional catalyst material may, for example, comprise about 10-15 wt. % metal oxide particles washcoated onto a Cu-exchanged or Fe-exchanged β-zeolite. This particular bi-functional catalyst material composition may be incorporated into an exhaust aftertreatment system for a lean-burn engine that is expected to generally operate a low speeds and/or with a low load demand and the reductant used to form the exhaust mixture 20 is ammonia. The bi-functional catalyst material may also, as another example, comprise about 0.5-2.0 wt. % metal oxide particles washcoated onto silver-supported alumina. This particular bi-functional catalyst material composition may be incorporated into an exhaust aftertreatment system for a lean-burn engine that is expected to generally operate at high speeds and/or with a high load demand and the reductant used to form the exhaust mixture 20 is a hydrocarbon or oxygenated hydrocarbon. Other compositions of the bi-functional catalyst material may of course be formulated and utilized by skilled artisans who are familiar with and understand the selective catalytic reduction of $NO_X$, its many applications, and how to best incorporate such technology into an exhaust aftertreatment system for a lean-burn engine.

The bi-functional catalyst material may be included in a wide range of exhaust aftertreatment system designs that are intended to remove the gaseous emissions, including $NO_X$, and any suspended particulate matter, if present, that may be expelled from the lean-burn engine. Skilled artisans are quite familiar with the various exhaust aftertreatment system designs that may be coupled to a lean-burn engine. As such, a detailed explanation of the many exhaust aftertreatment systems including their operation and the operation of their individual components is generally not necessary in order to understand the many possible applications of the bi-functional catalyst material. Several exemplary embodiments of an exhaust aftertreatment system that include the SCR converter 110 (or the numerical variants 210, 310, 410) and the bi-functional catalyst material are nevertheless described below.

Figure 2:
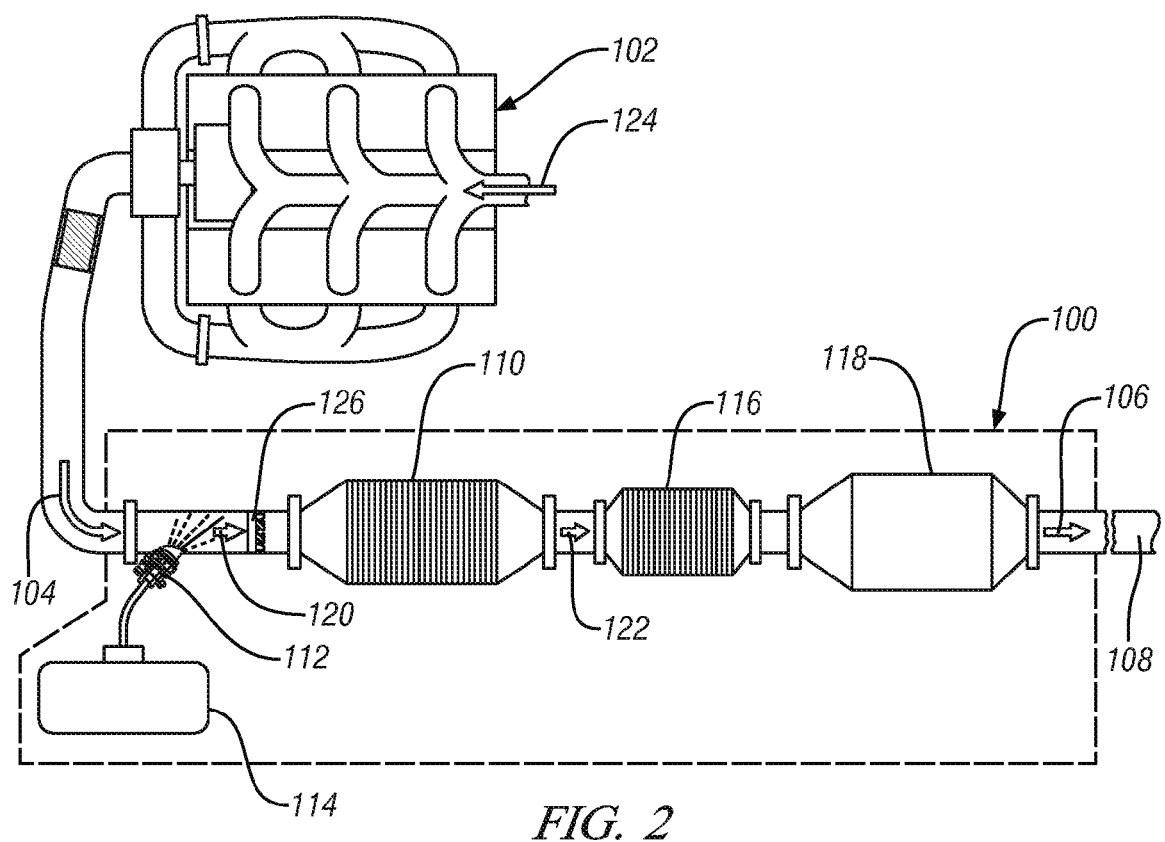
FIG. 2 is a schematic illustration of the relevant parts of one exemplary embodiment of an exhaust aftertreatment system that comprises a SCR converter including a bi-functional catalyst material.

FIG. 2 depicts a schematic illustration of the relevant parts of an exhaust aftertreatment system 100 for a vehicle that is powered by a charge compression-ignition (diesel) engine 102. The exhaust aftertreatment system 100 receives an exhaust flow 104 from the diesel engine 102 and communicates a treated exhaust flow 106 towards a vehicle tailpipe 108 for expulsion to the atmosphere. The exhaust aftertreatment system 100 may include the SCR converter 110 and a reductant injector 112 piped to an on-board and refillable reductant storage tank 114 to help remove $NO_X$ from the exhaust flow 104. The reductant utilized in this embodiment is urea. A variety of other devices may also be included in the exhaust aftertreatment system 100 to help remove other unwanted gaseous emissions and/or suspended particulate matter. These devices include a diesel oxidation converter 116 and a diesel particulate filter 118. Other devices not expressly shown in FIG. 2 may also be included in the exhaust aftertreatment system 100 as understood by skilled artisans.

The diesel engine 102, and more specifically its combustion chambers, is supplied with a lean mixture of air and fuel (lean A/F mixture) 124. The lean A/F mixture 124 contains more air than is stoichiometrically needed to combust the fuel and is typically controlled by known mechanical or electronic mechanisms. The air to fuel mass ratio of the lean A/F mixture 124 may generally range from about 15 to about 50 depending on the engine load and RPM. The compression-initiated combustion of the lean A/F mixture 124 in the diesel engine 102 generates mechanical energy for powering the vehicle and the exhaust flow 104 that is supplied to the exhaust aftertreatment system 100.

The exhaust flow 104 generally includes a relatively large amount of $N_2$ and $O_2$, some suspended particulate matter composed of uncombusted high-molecular weight hydrocarbons and other particles, and various unwanted gaseous emissions comprised of the following: (1) CO, (2) HC's, and (3) a $NO_X$ contingent primarily comprised of NO and $NO_2$. The $NO_X$ contingent of the exhaust flow 104 may fluctuate between about 50 and about 1500 ppm. The proportion of NO and $NO_2$ particles in the $NO_X$ contingent usually ranges from approximately 80%-95% NO and approximately 5%-20% $NO_2$. Such a $NO/NO_2$ particle distribution corresponds to a molar ratio of NO to $NO_2$ that ranges from about 4 to about 19. The exhaust flow 104 may reach temperatures of up to 900° C. depending the distance between the diesel engine 102 and the exhaust aftertreatment system 100 as well as the presence of any intervening components such as a turbocharger turbine and/or an EGR bleed line. The temperature of the exhaust flow 104 along with the $O_2$ content, which is relatively high, and the CO and HC's content, which are relatively low, promote an oxidizing environment in the exhaust flow 104.

The exhaust aftertreatment system 100 receives the exhaust flow 104 and, in this embodiment, combines the exhaust flow 104 with ammonia to form the exhaust mixture 120. The ammonia may be supplied by injecting urea, which is stored in the reductant storage tank 114, into the exhaust flow 104 through the reductant injector 112. The urea quickly evaporates and undergoes thermolysis and hydrolysis reactions in the hot and oxygen-abundant exhaust flow 104 to generate ammonia and form the exhaust mixture 120. The amount of urea injected into the exhaust flow 104 may be monitored and controlled by known control techniques that attempt to regulate the amount of ammonia present in the exhaust mixture 120 despite fluctuations in the temperature, chemical composition, and flow rate of the exhaust flow 104.

A mixer 126 or other suitable device may be provided upstream of the SCR converter 110 to help evaporate the injected urea and homogeneously distribute small particles of ammonia throughout the exhaust mixture 120.

The SCR converter 110 receives the exhaust mixture 120, converts $NO_X$ contained in the exhaust mixture 120 into $N_2$, and then discharges a $NO_X$-treated exhaust flow 122 for further treatment by the exhaust aftertreatment system 100. The SCR converter 110 houses an extruded cordierite monolithic honeycomb structure having several hundred to several thousand parallel flow-through cells through which the exhaust mixture 120 navigates. The bi-functional catalyst material, which may comprise a SCR catalyst and perovskite oxide particles, manganese-containing mixed metal oxide particles, or a mixture of perovskite oxide particles and manganese-containing mixed metal oxide particles dispersed on the SCR catalyst, is washcoated onto the honeycomb structure within the many flow-through cells. The SCR catalyst may, in this embodiment comprise a Fe/β-zeolite since the reductant injected into the exhaust flow 104 is urea. The bi-functional catalyst material converts $NO_X$ to $N_2$ as previously described; that is, the metal oxide particles generally oxidize NO to $NO_2$ so that the molar ratio of NO to $NO_2$ decreases for more effective low-temperature $NO_X$ reduction and, simultaneously, the SCR catalyst generally reduces $NO_X$ to $N_2$ by facilitating various chemical reactions between NO, $NO_2$, and $NH_3$. The bi-functional catalyst material may reduce the NO to $NO_2$ molar ratio to below 3 and preferably to around 1.

The diesel oxidation converter 116 located downstream of the SCR converter 110 receives the $NO_X$-treated exhaust flow 122 and removes any CO and HC's still present. The diesel oxidation converter 116 houses a diesel oxidation catalyst that may comprise a combination of platinum and palladium or some other suitable oxidation catalyst formulation. The $NO_X$-treated exhaust flow 122 traverses the diesel oxidation converter 116 and achieves intimate exposure with the diesel oxidation catalyst to promote the oxidation of CO (to $CO_2$) and HC's (to $CO_2$ and $H_2O$). The amount of platinum and palladium used to fabricate the diesel oxidation catalyst, however, may be much lower than what is customarily found in conventional diesel oxidation catalysts. This is because the upstream SCR converter 110, as previously described, includes the bi-functional catalyst material and is capable of oxidizing CO and HC's along with NO. The need to include conventional amounts of platinum and palladium in the diesel oxidation catalyst is therefore avoided since the exhaust aftertreatment system 100 can function effectively if the diesel oxidation converter 116 oxidizes only the residual CO and HC's that pass through the SCR converter 110. Platinum may even be omitted from inclusion in the diesel oxidation catalyst in some instances. Nothing here prevents a conventionally formulated diesel oxidation catalyst from being used in the diesel oxidation converter 116, if desired.

The $NO_X$-treated exhaust flow 122 discharged from the diesel oxidation converter 116 is then supplied to the diesel particulate filter 118 to remove any suspended particulate matter. The diesel particulate filter 118 may be constructed according to any known design.

The treated exhaust flow 106 that emerges from the exhaust aftertreatment system 100 contains mostly $N_2$, $O_2$, $H_2O$, and $CO_2$. The SCR converter 110, the diesel oxidation converter 116, and the diesel particulate filter 118 each contribute to a substantial reduction or the complete elimination of unwanted gaseous emissions (CO, HC's and $NO_X$) and suspended particulate matter. The bi-functional catalyst material oxidizes NO to $NO_2$, CO to $CO_2$, HC's to $CO_2$ and $H_2O$, and also reduces $NO_X$ to $N_2$. The diesel oxidation catalyst 116 oxidizes any residual CO and HC's that pass through the SCR converter 110. The diesel particulate filter 118 removes suspended particulate matter. The low-temperature $NO_X$ conversion efficiency of the bi-functional catalyst material is not expected to suffer in the absence of an upstream oxidation catalyst. Nor is the oxidation performance of the diesel oxidation catalyst expected to be adversely impacted by the relatively small amounts of platinum, if any, and palladium used considering the NO, CO, and HC oxidation relief afforded to the diesel oxidation catalyst by the bi-functional catalyst material.

Figure 3:
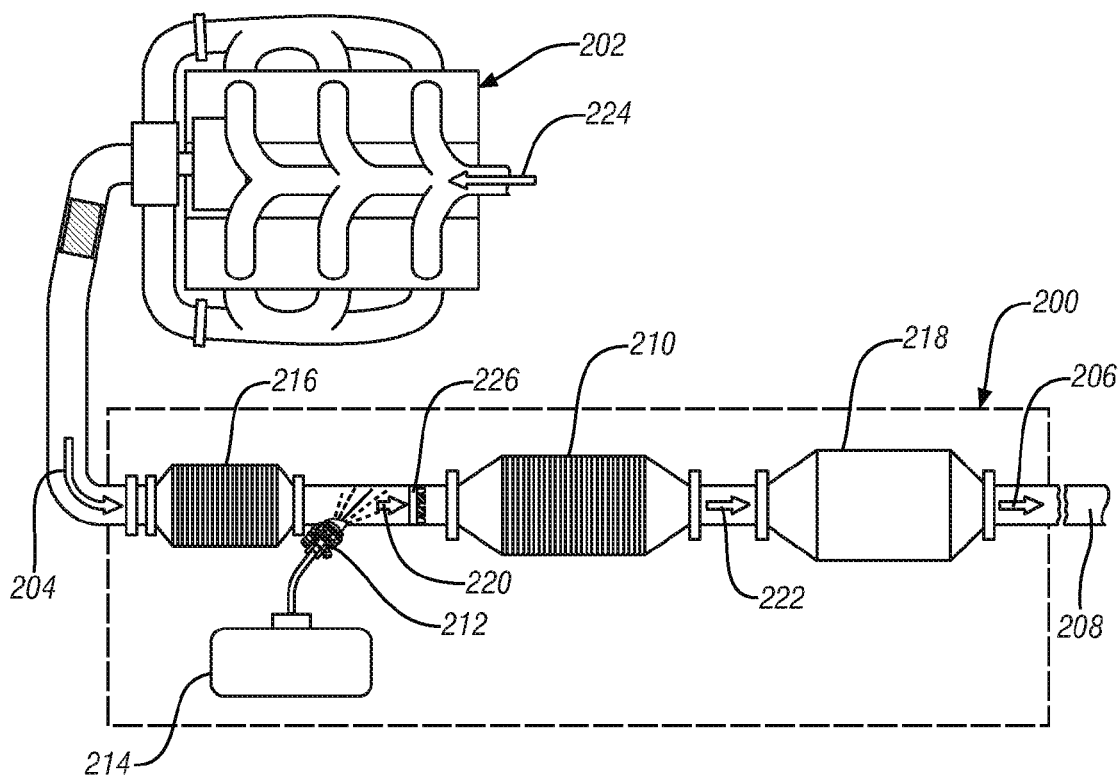
FIG. 3 is a schematic illustration of the relevant parts of another exemplary embodiment of an exhaust aftertreatment system that comprises a SCR converter including a bi-functional catalyst material.

It should be understood that the exhaust aftertreatment system 100 depicted in FIG. 2 may be modified in many different ways. For example, in an alternative exhaust aftertreatment system 200, as shown in FIG. 3, the diesel oxidation converter 216 may be positioned upstream of the SCR converter 210. When the diesel oxidation converter 216 is arranged in such a position, the amount of platinum and palladium used to fabricate the diesel oxidation catalyst may be much lower than what is customarily found in conventional diesel oxidation catalysts for the same reason as before. That is, the downstream SCR converter 210 includes the bi-functional catalyst material and is capable of oxidizing CO, HC's, and NO to $NO_2$ at a rate sufficient to lower the $NO:NO_2$ molar ratio to a more desired figure while simultaneously reducing $NO_X$ to $N_2$. The diesel oxidation converter 216, as a result, can function effectively in the exhaust aftertreatment system 200 even if the diesel oxidation catalyst it houses oxidizes only CO and HC's. As another example, referring to FIGS. 2 and 3, ammonia may be directly injected into the exhaust flow 104, 204 instead of urea. Or, in another example, the reductant may be diesel fuel instead of ammonia or urea. The diesel fuel may be introduced into the exhaust flow 104, 204 by simply bypassing some diesel fuel around the diesel engine 102, 202. The reductant injector 112, 212 and the reduction storage tank 114, 214 may not be needed in such a circumstance since diesel fuel is already stored in the vehicle's fuel tank and would be readily available to the exhaust aftertreatment system 100, 200. The bi-functional catalyst material may comprise $Ag/Al_2O_3$ or a CuCo/Y-zeolite as the SCR-catalyst if diesel fuel is used as the reductant. In yet another example, the diesel oxidation converter 116, 216 and the diesel particulate filter 118, 218 may be combined into a single unit.

Figure 4:
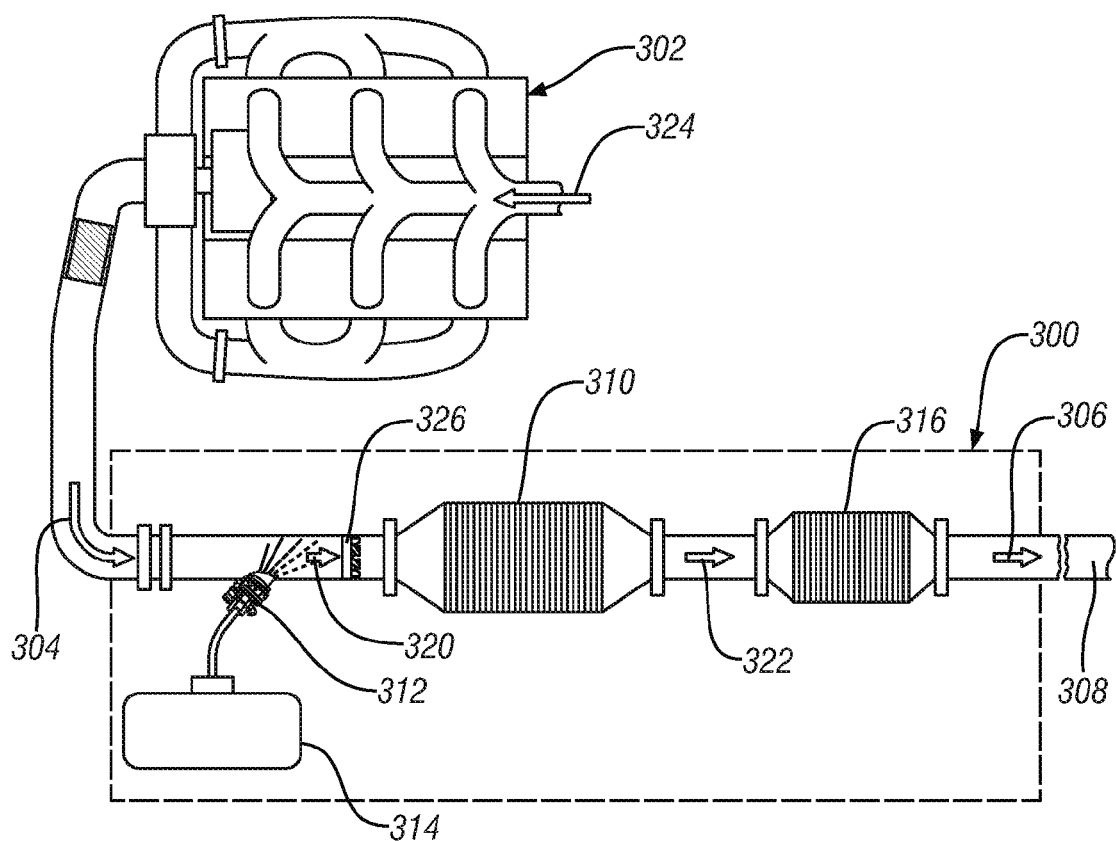
FIG. 4 is a schematic illustration of the relevant parts of yet another exemplary embodiment of an exhaust aftertreatment system that comprises a SCR converter including a bi-functional catalyst material.

FIG. 4 depicts a schematic illustration of the relevant parts of an exhaust aftertreatment system 300 for a vehicle that is powered by a lean-burn spark-ignition engine (gasoline engine) 302 such as a SIDI engine. The exhaust aftertreatment system 300, much like the previous embodiments, receives an exhaust flow 304 from the gasoline engine 302 and communicates a treated exhaust flow 306 towards a vehicle tailpipe 308 for expulsion to the atmosphere. The exhaust aftertreatment system 300 may include the SCR converter 310 and a reductant injector 312 piped to an on-board reductant storage tank 314 to help remove $NO_X$ from the exhaust flow 304. The reductant utilized in this embodiment is, once again, urea. A catalytic converter 316 may be included in the exhaust aftertreatment system 300 to help remove other unwanted gaseous emissions. Other devices not expressly shown in FIG. 4 may also be included in the exhaust aftertreatment system 300 as understood by skilled artisans.

The gasoline engine 302 receives and combusts a lean mixture of air and fuel (lean A/F mixture) 324. The lean A/F mixture 324 contains more air than is stoichiometrically needed to combust the fuel and is typically controlled by known mechanical or electronic mechanisms. The air to fuel mass ratio of the lean A/F mixture 324 may generally range from about 20 to about 65 depending on the engine load and RPM. The spark-assisted combustion of the lean A/F mixture 324 in the gasoline engine 302 generates mechanical energy for powering the vehicle and the exhaust flow 304 that is supplied to the exhaust aftertreatment system 300.

The exhaust flow 304 generally includes a relatively large amount of $N_2$ and $O_2$ along with various unwanted gaseous emissions comprised of the following: (1) CO, (2) HC's, and (3) a $NO_X$ contingent primarily comprised of NO and $NO_2$. The $NO_X$ contingent of the exhaust flow 304 may fluctuate between about 50 and about 1500 ppm. The proportion of NO and $NO_2$ particles in the $NO_X$ contingent usually ranges from approximately 80%-95% NO and approximately 5%-20% $NO_2$. Such a $NO/NO_2$ particle distribution corresponds to a molar ratio of NO to $NO_2$ that ranges from about 4 to about 19. The exhaust flow 304 may reach temperatures of up to 900° C. depending the distance between the gasoline engine 302 and the exhaust aftertreatment system 300 as well as the presence of any intervening components such as a turbocharger turbine and/or an EGR bleed line. The temperature of the exhaust flow 304 along with the $O_2$ content, which is relatively high, and the CO and HC's content, which are relatively low, promote an oxidizing environment in the exhaust flow 304.

The exhaust aftertreatment system 300 receives the exhaust flow 304 and, in this embodiment, combines the exhaust flow 304 with ammonia to form the exhaust mixture 320. The ammonia may be supplied by injecting urea, which is stored in the reductant storage tank 314, into the exhaust flow 304 through the reductant injector 312. The urea quickly evaporates and undergoes thermolysis and hydrolysis reactions in the hot and oxygen-abundant exhaust flow 304 to generate ammonia and form the exhaust mixture 320. The amount of urea injected into the exhaust flow 304 may be monitored and controlled by known control techniques that attempt to regulate the amount of ammonia present in the exhaust mixture 320 despite fluctuations in the temperature, chemical composition, and flow rate of the exhaust flow 304. A mixer 326 or other suitable device may be provided upstream of the SCR converter 310 to help evaporate the injected urea and homogeneously distribute small particles of ammonia throughout the exhaust mixture 320.

The SCR converter 310 receives the exhaust mixture 320, converts $NO_X$ contained in the exhaust mixture 320 into $N_2$, and discharges a $NO_X$-treated exhaust mixture 322 for further treatment by the exhaust aftertreatment system 300. The SCR converter 310 houses an extruded cordierite monolithic honeycomb structure having several hundred to several thousand parallel flow-through cells through which the exhaust mixture 320 navigates. The bi-functional catalyst material, which may comprise a SCR catalyst and perovskite oxide particles, manganese-containing mixed metal oxide particles, or a mixture of perovskite oxide particles and manganese-containing mixed metal oxide particles dispersed on the SCR catalyst, is washcoated onto the honeycomb structure within the many flow-through cells. The SCR catalyst, in this embodiment, may comprise a Fe/β-zeolite since the reductant injected into the exhaust flow 304 is urea. The bi-functional catalyst material converts $NO_X$ to $N_2$ as previously described; that is, the metal oxide particles generally oxidize NO to $NO_2$ so that the molar ratio of NO to $NO_2$ decreases for more effective low-temperature $NO_X$ reduction and, simultaneously, the SCR catalyst generally reduces $NO_X$ to $N_2$ by facilitating various chemical reactions between NO, $NO_2$, and $NH_3$. The bi-functional catalyst material may reduce the NO to $NO_2$ molar ratio to below 3 and preferably to around 1.

The catalytic converter 316 located downstream of the SCR converter 310 receives the $NO_X$-treated exhaust flow 322 and removes any CO or HC's still present. The catalytic converter 316 houses a three-way-catalyst catalyst (TWC) that may comprise a combination of platinum, palladium, and rhodium. The $NO_X$-treated exhaust mixture 322 traverses the catalytic converter 316 and achieves intimate exposure with the TWC to promote the oxidation of any residual CO (to $CO_2$) and HC's (to $CO_2$ and $H_2O$). The amount of platinum, palladium, and rhodium used to fabricate the TWC, however, may be much lower than what is customarily found in conventional TWC's. This is because the upstream SCR converter 310, as previously described, includes the bi-functional catalyst material and is capable of oxidizing CO and HC's along with NO. The need to include conventional amounts of platinum, palladium, and rhodium in the TWC is therefore avoided since the exhaust aftertreatment system 300 can function effectively if the catalytic converter 316 oxidizes only the CO and HC's that pass through the SCR converter 310. Nothing here prevents a conventionally formulated TWC from being used in the catalytic converter 316, if desired, for example, to help treat the exhaust flow 304 if excess reductants (CO, HC's, $H_2$) are present for whatever reason.

The treated exhaust 306 that emerges from the exhaust aftertreatment system 300 contains mostly $N_2$, $O_2$, $H_2O$, and $CO_2$. The SCR converter 310 and the catalytic converter 316 each contribute to a substantial reduction or the complete elimination of unwanted gaseous emissions (CO, HC's and $NO_X$). The bi-functional catalyst material oxidizes NO to $NO_2$, CO to $CO_2$, and HC's to $CO_2$ and $H_2O$, and also reduces NO to $N_2$. The TWC oxidizes any residual CO and HC's that pass through the SCR converter 310. The low-temperature $NO_X$ conversion efficiency of the bi-functional catalyst material is not expected to suffer in the absence of an upstream oxidation catalyst—such as a diesel oxidation catalyst or a two-way-catalyst. Nor is the oxidation performance of the TWC expected to be adversely impacted by the relatively small amounts of platinum, palladium, and rhodium used considering the NO, CO, and HC oxidation relief afforded to the TWC by the bi-functional catalyst material.

Figure 5:
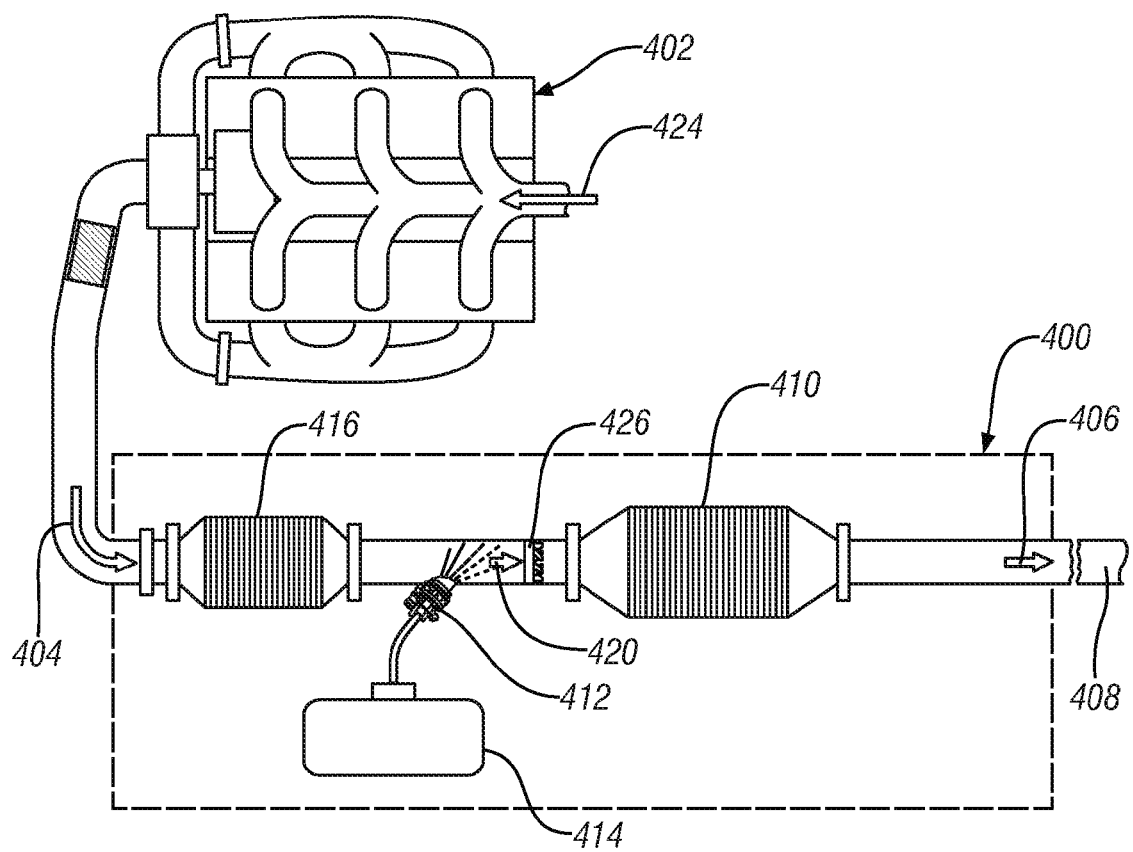
FIG. 5 is a schematic illustration of the relevant parts of still another exemplary embodiment of an exhaust aftertreatment system that comprises a SCR converter including a bi-functional catalyst material.

It should be understood that the exhaust aftertreatment system 300 depicted in FIG. 4 may be modified in many different ways. For example, in an alternative exhaust aftertreatment system 400, as shown in FIG. 5, the catalytic converter 416 may be positioned upstream of the SCR converter 410. When the catalytic converter 416 is arranged in such a position, the amount of platinum, palladium, and rhodium used to fabricate the TWC may be much lower than what is customarily found in conventional TWC catalysts for the same reason as before. That is, the downstream SCR converter 410 includes the bi-functional catalyst material and is capable of oxidizing CO, HC's, and NO to $NO_2$ at a rate sufficient to lower the $NO:NO_2$ molar ratio to a more desired figure while simultaneously reducing $NO_X$ to $N_2$. The catalytic converter 416, as a result, can function effectively in the exhaust aftertreatment system 400 even if the TWC it houses oxidizes only CO and HC's. The TWC housed in the catalytic converter 416 may, in an alternative embodiment, include conventional amounts of PGM's so that ammonia can be passively generated over the TWC from native $NO_X$ and $H_2$ contained in the exhaust flow 404 during periodic instances when the gasoline engine 402 receives and combusts a rich mixture of air and fuel. The ability to passively generate ammonia in such a manner would allow the reductant injector 412 and the reducant storage tank 414 to be removed from the exhaust aftertreatment system 400. As another example, referring to FIGS. 4 and 5, ammonia may be directly injected into the exhaust flow 304, 404 instead of urea. Or, in another example, the reductant may be gasoline instead of ammonia or urea. The gasoline may be introduced into the exhaust flow 304, 404 by simply bypassing some gasoline around the gasoline engine 302, 402. The reductant injector 312, 412 and the reduction storage tank 314, 414 may not be needed in such a circumstance since gasoline is already stored in the vehicle's fuel tank and would be readily available to the exhaust aftertreatment system 300, 400. The bi-functional catalyst material may comprise $Ag/Al_2O_3$ or a CuCo/Y-zeolite as the SCR-catalyst if gasoline is used as the reductant.

Many other modifications and variations of the exhaust aftertreatment systems 100, 200, 300, 400 described above are also possible given the knowledge of skilled artisans in the field of lean-burn engine exhaust treatment.

Example

This Example demonstrates the dual catalytic activity of several exemplary bi-functional catalyst materials that have been evaluated in a laboratory reactor configured to flow a simulated lean-burn engine exhaust feedstream. Each of the exemplary bi-functional catalyst materials evaluated had a different weight percent loading of $La_{0.9}Sr_{0.1}CoO_3$ particles washcoated onto a Fe/β-zeolite SCR catalyst and was either degreened or subjected to high-temperature aging. The weight percent loading of the $La_{0.9}Sr_{0.1}CoO_3$ particles for each exemplary bi-functional catalyst is based on the weight of the bi-functional catalyst material (i.e., the total weight of the $La_{0.9}Sr_{0.1}CoO_3$ particles and the SCR catalyst). While this Example evaluates different loadings of $La_{0.9}Sr_o CoO_3$ particles (perovskite oxide particles) on a Fe/β-zeolite SCR catalyst, it is expected that the same general results and data would be achieved by either mixing the perovskite oxide particles with manganese-containing mixed metal oxide particles or completely substituting the perovskite oxide particles with manganese-containing mixed metal oxide particles.

A citric acid method was used to prepare a quantity of $La_{0.9}Sr_{0.1}CoO_3$ particles. First, appropriate amounts of $La(NO_3)_3 \cdot 6H_2O$, $Co(NO_3)_2 \cdot 6H_2O$, and $Sr(NO_3)_2$ were dissolved in distilled water with citric acid monohydrate. The amount of water used was 46.2 mL per gram of $La(NO_3)_3 \cdot 6H_2O$. The citric acid was added to the distilled water in a 10 wt. % excess to ensure complete complexation of the metal ions. The solution was set on a stirring and heating plate and stirred for 1 hour at room temperature. The solution was then heated to 80° C. under continuous stirring to slowly evaporate the water until the solution became a viscous gel and started evolving $NO/NO_2$ gases. The resulting spongy material was crushed and calcined at 700° C. for about 5 hours in static air. The temperature was then ramped down at a rate of 10° C. per minute. When the temperature reached just below 300° C., the citrate ions combusted vigorously and caused a large spike in temperature and powder displacement. The powder was thus covered with several layers of $ZrO_2$ balls to prevent such powder displacement yet still allow for gas mobility. The prepared $La_{0.9}Sr_{0.1}CoO_3$ particles were characterized by $N_2$ physisorption for surface area measurements and X-ray diffraction for their bulk structure measurements.

The $La_{0.9}Sr_{0.1}CoO_3$ particles were then ball milled with 6.33 mL of water per gram of the $La_{0.9}Sr_{0.1}CoO_3$ particles for 18 hours. Afterwards, the slurry was stirred continuously and 0.33 mL $HNO_3$ (0.1M) per gram of the $La_{0.9}Sr_{0.1}CoO_3$ particles and 5 mL of water per gram of the $La_{0.9}Sr_{0.1}CoO_3$ particles were added. The resulting washcoat solution had a concentration of 0.114 grams of $La_{0.9}Sr_{0.1}CoO_3$ particles per mL. The slurry was washcoated onto a monolithic honeycomb core sample (¾ inch diameter by 1 inch length with a flow-through cell density of 400 per square inch) that had already been washcoated with the Fe/β-zeolite. Next, after washcoating of the $La_{0.9}Sr_{0.1}CoO_3$ particles, the monolithic honeycomb core sample was dried and calcined at 550° C. for 5 hours in static air.

This procedure was repeated several times to prepare monolithic honeycomb core samples that had a $La_{0.9}Sr_{0.1}CoO_3$ particle loadings of either 1.0, 5.5, or 12 wt. %. One core sample of each $La_{0.9}Sr_{0.1}CoO_3$ particle loading was degreened and the other was high-temperature aged. The degreened bi-functional catalyst materials were hydrothermally aged in air+10% $H_2O$ for 5 hours at 550° C. The high-temperature aged bi-functional catalyst materials were hydrothermally aged in air+10% $H_2O$ for 48 hours at 700° C.

Monolithic core samples were also prepared that included only a Fe/β-zeolite SCR catalyst, only a Cu/chabazite-zeolite SCR catalyst, and only $La_{0.9}Sr_{0.1}CoO_3$ particles for comparative evaluation purposes. The Fe/β-zeolite SCR catalysts and the Cu/chabazite-zeolite SCR catalysts were either degreened or high-temperature aged similar to the bi-functional catalyst materials. The $La_{0.9}Sr_{0.1}CoO_3$ particles alone were aged slightly different as indicated below.

Figure 6:
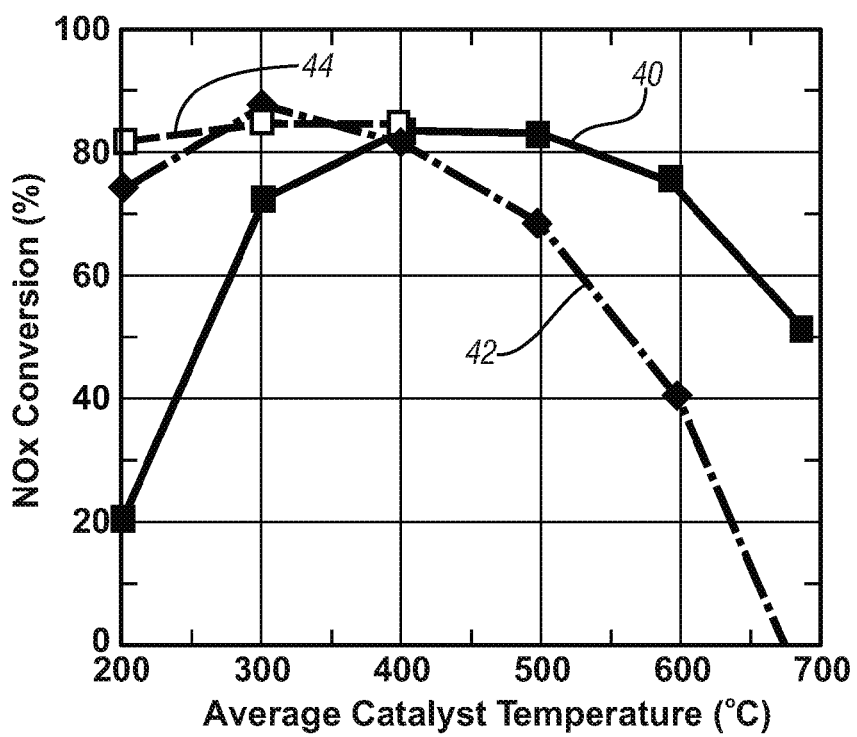
FIG. 6 is a graph that shows the $NO_X$ conversion efficiency of a Fe/β-zeolite SCR catalyst and a Cu/chabazite-zeolite SCR catalyst when exposed to simulated lean-burn engine exhaust.

FIG. 6 shows the $NO_X$ conversion efficiencies of the high-temperature aged Fe/β-zeolite and the high-temperature aged Cu/chabazite-zeolite SCR catalysts at temperatures ranging from 200° C. to 700° C. Temperature (° C.) is plotted on the X-axis and $NO_X$ conversion (%) is plotted on the Y-axis. The $NO_X$ conversion of the high-temperature aged Fe/β-zeolite SCR catalyst is identified by numeral 40 and the $NO_X$ conversion of the high-temperature aged Cu/chabazite-zeolite SCR catalyst is identified by numeral 42. The simulated exhaust feedstream passed over each of the SCR catalysts had a space velocity of about 30,000 $h^{-1}$ and comprised approximately 10% $O_2$, 5% $H_2O$, 8% $CO_2$, 200 ppm NO, 180 ppm $NH_3$, and the balance $N_2$.

As can be seen from FIG. 6, the Cu/chabazite-zeolite SCR catalyst demonstrated better low-temperature $NO_X$ conversion and the Fe/β-zeolite SCR catalyst demonstrated better high-temperature $NO_X$ conversion when the $NO_X$ content of the feedstream was composed entirely of NO. But slightly altering the $NO_X$ content of the feedstream to include $NO_2$ so that the NO:$NO_2$ molar ratio is about 1.5 (40% $NO_2$, 60% NO) significantly improved the low-temperature $NO_X$ conversion efficiency of the Fe/zeolite SCR catalyst. The $NO_X$ conversion of the high-temperature aged Fe/β-zeolite SCR catalyst when the feedstreem included $NO_X$ having a molar ratio of NO to $NO_2$ around 1.5 is identified by numeral 44.

Figure 7:
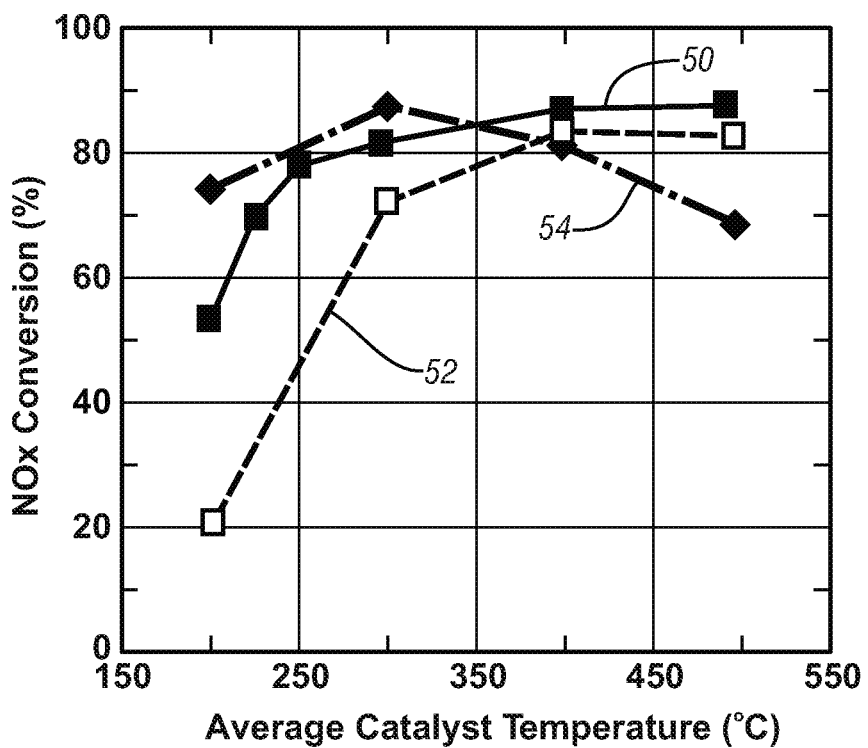
FIG. 7 is a graph that shows the $NO_X$ conversion efficiency of a Cu/chabazite-zeolite SCR catalyst and pair of Fe/β-zeolite SCR catalysts (one degreened and one high-temperature aged) when exposed to simulated lean-burn engine exhaust.

FIG. 7 shows the $NO_X$ conversion efficiency for the degreened Fe/β-zeolite SCR catalyst, the high-temperature aged Fe/β-zeolite SCR catalyst, and the high-temperature aged Cu/chabazite-zeolite SCR catalyst at temperatures ranging from 150° C. to 550° C. The two Fe/β-zeolite SCR catalysts were aged differently and plotted in an attempt to demonstrate the effects of catalyst aging. Temperature (° C.) is plotted on the X-axis and $NO_X$ conversion (%) is plotted on the Y-axis. The $NO_X$ conversion of the degreened Fe/β-zeolite SCR catalyst is identified by numeral 50, the $NO_X$ conversion of the high-temperature aged Fe/β-zeolite SCR catalyst is identified by numeral 52, and the $NO_X$ conversion of the high-temperature aged Cu/chabazite-zeolite SCR catalyst is identified by numeral 54. The simulated exhaust feedstream passed over each of the SCR catalysts had a space velocity of about 30,000 $h^{-1}$ and comprised approximately 10% $O_2$, 5% $H_2O$, 5% $CO_2$, 200 ppm NO, 180 ppm $NH_3$, and the balance $N_2$.

As shown in FIG. 7, the $NO_X$ conversion efficiency of the degreened Fe/β-zeolite SCR catalyst and the high-temperature aged Cu/chabazite-zeolite SCR catalyst were quite comparable although the degreened Fe/β-zeolite SCR catalyst performed slightly better at higher temperatures while the high-temperature aged Cu/chabazite-zeolite SCR performed slightly better at lower temperatures. The $NO_X$ conversion efficiency of the high-temperature aged Fe/β-zeolite SCR was noticeably lower than that of the degreened Fe/β-zeolite SCR as a result of aging. The aging effect was especially noticeable at temperatures below about 300° C.

Figure 8:
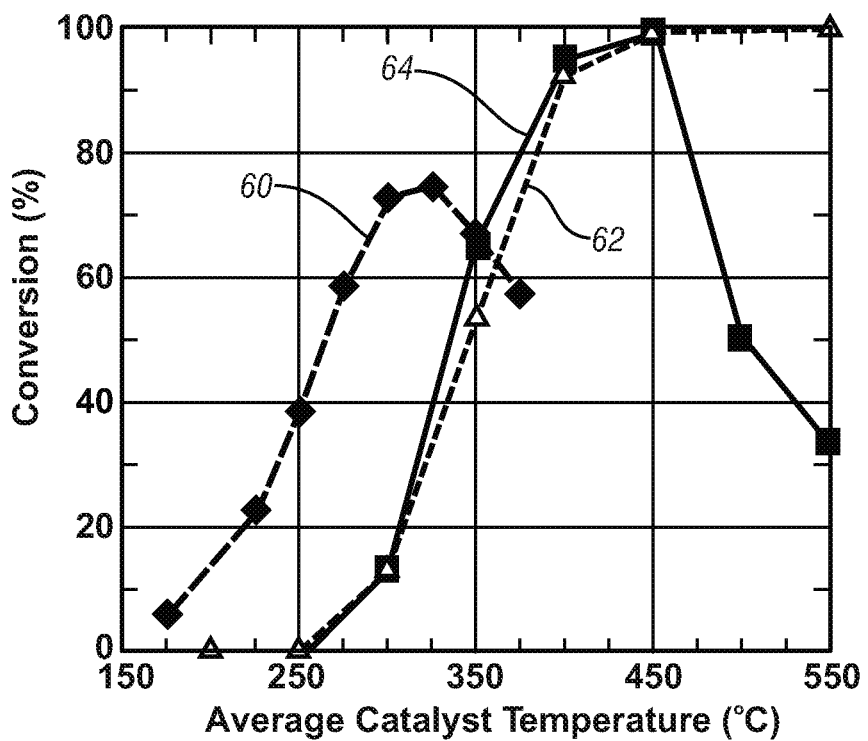
FIG. 8 is a graph that shows the oxidation capabilities of $La_{0.9}Sr_{0.1}CoO_3$ particles for various reactions when exposed to simulated lean-burn engine exhaust.

FIG. 8 shows the catalytic activity of the $La_{0.9}Sr_{0.1}CoO_3$ particles alone for various reactions at temperatures ranging from 150° C. to 550° C. Temperature (° C.) is plotted on the X-axis and conversion (%) is plotted on the Y-axis. The conversion of NO(NO+$O_2$) is identified by numeral 60, the conversion of $NH_3$ ($NH_3$+$O_2$) is identified by numeral 62, and the negative conversion of $NO_X$ (NO+$NH_3$+$O_2$) is identified by numeral 64. Negative $NO_X$ conversion refers to how much of the $NH_3$ is converted to $NO_X$ instead of $N_2$. The $La_{0.9}Sr_{0.1}CoO_3$ particles were hydrothermally aged in air+ 10% $H_2O$ for 5 hours at 700° C.

The simulated exhaust feedstream passed over the $La_{0.9}Sr_{0.1}CoO_3$ particles to determine NO conversion (60) had a space velocity of about 30,000 $h^{-1}$ and comprised approximately 10% $O_2$, 400 ppm NO, and the balance $N_2$. The simulated exhaust feedstream passed over the $La_{0.9}Sr_{0.1}CoO_3$ particles to determine $NH_3$ conversion (62) had a space velocity of about 30,000 $h^{-1}$ and comprised approximately 10% $O_2$, 5% $H_2O$, 5% $CO_2$, 200 ppm $NH_3$, and the balance $N_2$. The simulated exhaust feedstream passed over the $La_{0.9}Sr_{0.1}CoO_3$ particles to determine $NO_X$ conversion (64) had a space velocity of about 30,000 $h^{-1}$ and comprised approximately 10% $O_2$, 5% $H_2O$, 5% $CO_2$, 200 ppm NO, 200 ppm $NH_3$, and the balance $N_2$.

As shown in FIG. 8, the $La_{0.9}Sr_{0.1}CoO_3$ particles oxidized NO and $NH_3$ rather well at temperatures above about 225° C. and 350° C., respectively. The undesirable oxidation of $NH_3$ into $NO_X$, however, occurred at temperatures of about 250° C. to about 450° C. At temperatures above about 450° C., as shown, the oxidation of $NH_3$ to $N_2$ was much preferred over the oxidation of $NO_X$ to $N_2$. This oxidation selectivity resulted in a reduction of the negative $NO_X$ conversion.

FIGS. 9-16 depict some catalytic performance data of the exemplary bi-functional catalyst materials. The same catalytic performance data for the Fe/β-zeolite SCR catalyst and $La_{0.9}Sr_{0.1}CoO_3$ particles are also shown in some instances for comparison purposes.

Figure 9:
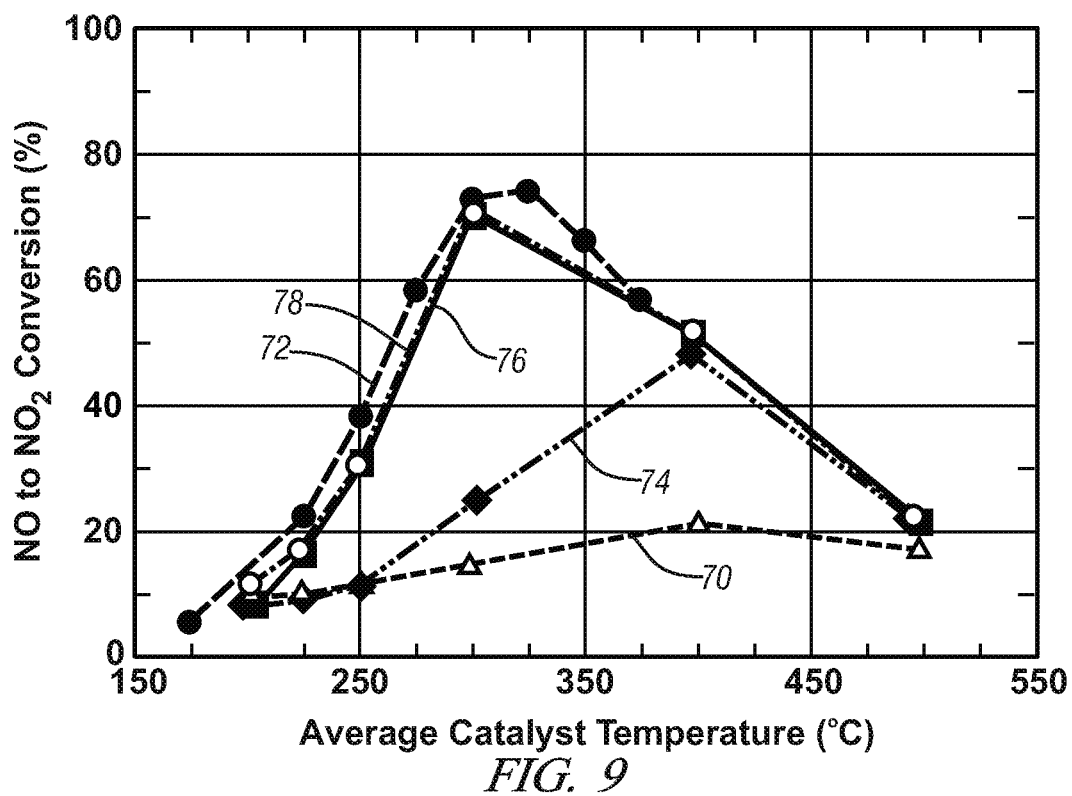
FIG. 9 is a graph that shows the NO to $NO_2$ oxidation performance, when exposed to simulated lean-burn engine exhaust, of a degreened Fe/β-zeolite SCR catalyst, $La_{0.9}Sr_{0.1}CoO_3$ particles, and three degreened bi-functional catalyst materials each with a different $La_{0.9}Sr_{0.1}CoO_3$ particle loading.
Figure 10:
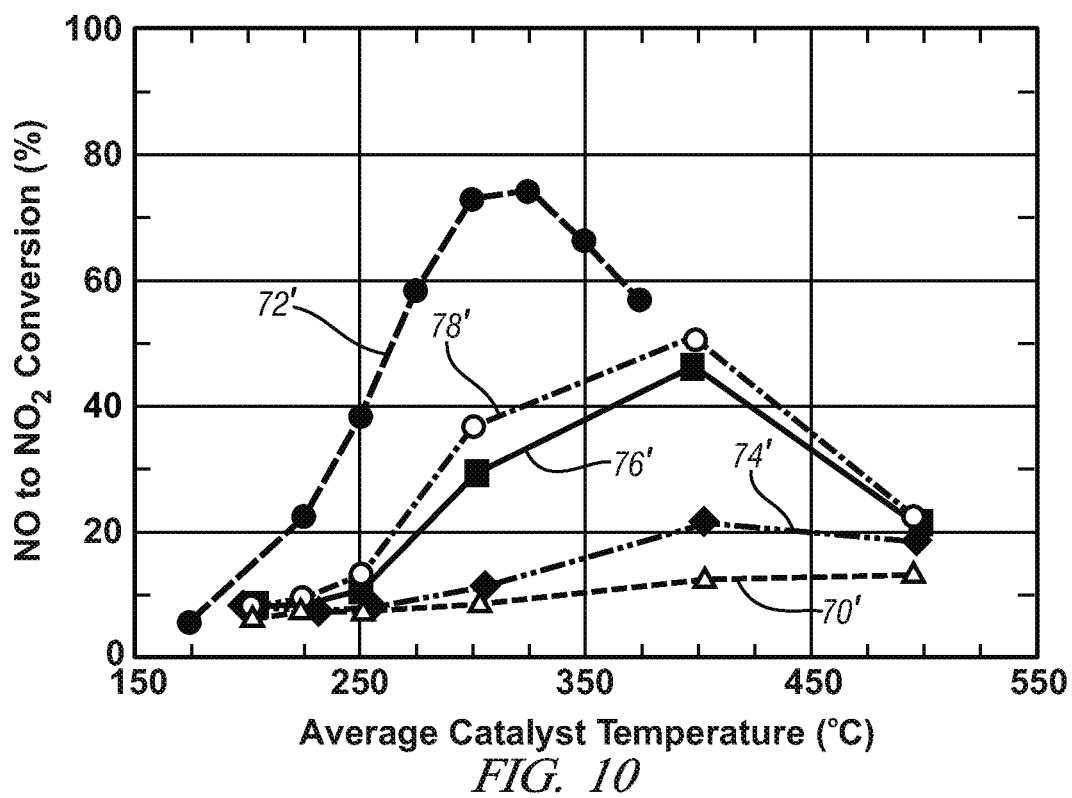
FIG. 10 is a graph that shows the NO to $NO_2$ oxidation performance, when exposed to simulated lean-burn engine exhaust, of a high-temperature aged Fe/β-zeolite SCR catalyst, $La_{0.9}Sr_{0.1}CoO_3$ particles, and three high-temperature aged bi-functional catalyst materials each with a different $La_{0.9}Sr_{0.1}CoO_3$ particle loading.

FIGS. 9 and 10 show the NO (to $NO_2$) oxidation performance, in the absence of $NH_3$, of the Fe/β-zeolite SCR catalyst, the $La_{0.9}Sr_{0.1}CoO_3$ particles alone, and the bi-functional catalyst materials at temperatures ranging from 150° C. to 550° C. Temperature (° C.) is plotted on the X-axis and NO to $NO_2$ conversion (%) is plotted on the Y-axis. The Fe/β-zeolite SCR catalyst and the bi-functional catalyst materials represented in FIG. 9 were degreened while the Fe/β-zeolite SCR catalyst and the bi-functional catalyst materials represented in FIG. 10 were high-temperature aged. The $La_{0.9}Sr_{0.1}CoO_3$ particles in both of FIGS. 9 and 10 were hydrothermally aged for 5 hours at 700° C. The simulated exhaust feedstream passed over the Fe/β-zeolite SCR catalyst and the bi-functional catalyst materials had a space velocity of about 30,000 $h^{-1}$ and comprised approximately 10% $O_2$, 5% $H_2O$, 5% $CO_2$, 200 ppm NO, and the balance $N_2$. The simulated exhaust feedstream passed over the $La_{0.9}Sr_{0.1}CoO_3$ particles had a space velocity of about 30,000 $h^{-1}$ and comprised 10% $O_2$, 400 ppm NO, and the balance $N_2$.

The NO to $NO_2$ conversion of the Fe/β-zeolite SCR catalyst is identified by numeral 70 in FIG. 9 and numeral 70' in FIG. 10, the NO to $NO_2$ conversion of the $La_{0.9}Sr_{0.1}CoO_3$ particles alone is identified by numeral 72 in FIG. 9 and numeral 72' in FIG. 10, the NO to $NO_2$ conversion of the bi-functional catalyst material having 1.0 wt. % $La_{0.9}Sr_{0.1}CoO_3$ particles is identified as numeral 74 in FIG. 9 and numeral 74' in FIG. 10, the NO to $NO_2$ conversion of the bi-functional catalyst material having 5.5 wt. % $La_{0.9}Sr_{0.1}CoO_3$ particles is identified as numeral 76 in FIG. 9 and numeral 76' in FIG. 10, and the NO to $NO_2$ conversion of the bi-functional catalyst material having 12.0 wt. % $La_{0.9}Sr_{0.1}CoO_3$ particles is identified as numeral 78 in FIG. 9 and numeral 78' in FIG. 10.

As shown in both of FIGS. 9 and 10, the Fe/β-zeolite SCR catalyst oxidized only a small amount of the NO to $NO_2$ in the exhaust feedstream even when lightly aged (FIG. 9). The $La_{0.9}Sr_{0.1}CoO_3$ particles generally oxidized NO to $NO_2$ the best. Each of the bi-functional catalyst materials performed much better than the Fe/β-zeolite SCR catalyst alone and in some instances just as well as the $La_{0.9}Sr_{0.1}CoO_3$ particles. The degreened 5.5 wt. % and 12 wt. % $La_{0.9}Sr_{0.1}CoO_3$ particle loaded bi-functional catalyst materials, for instance, closely emulated the NO oxidation performance of the $La_{0.9}Sr_{0.1}CoO_3$ particles alone (FIG. 9). Furthermore, the NO to $NO_2$ oxidation of the degreened (FIG. 9) and high-temperature aged (FIG. 10) bi-functional catalyst materials generally improved as the $La_{0.9}Sr_{0.1}CoO_3$ particle loading increased. The degreened bi-functional catalyst materials also generally oxidized NO to $NO_2$ better than the high-temperature aged bi-functional catalyst materials.

Figure 11:
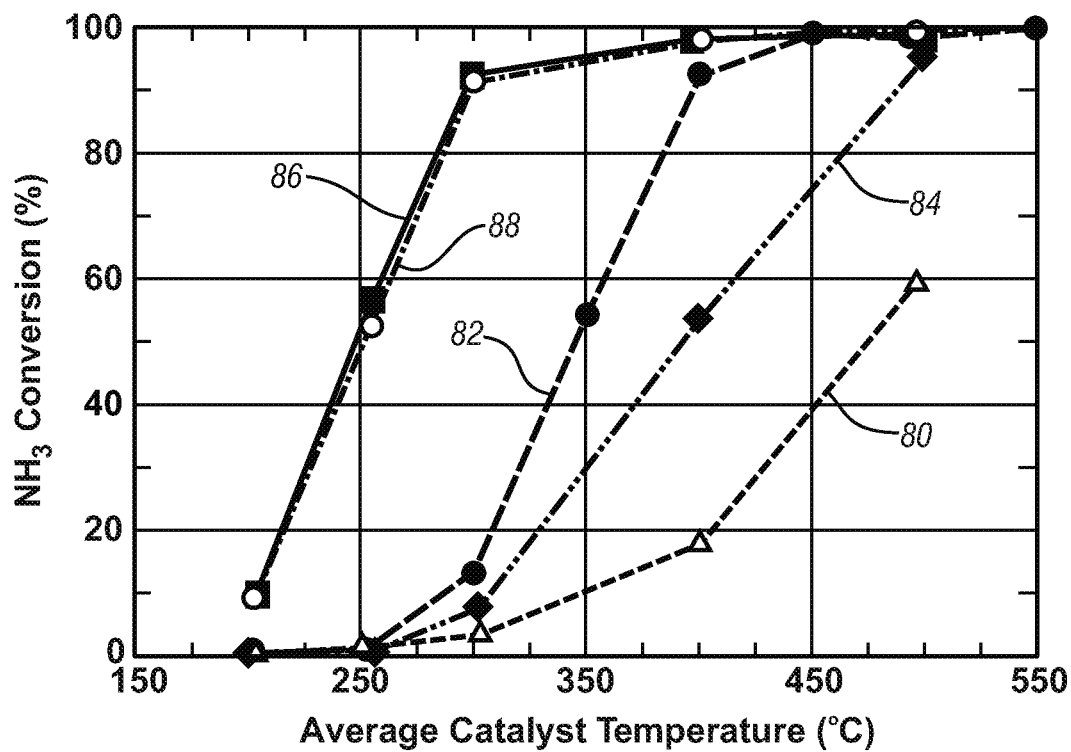
FIG. 11 is a graph that shows the $NH_3$ oxidation performance, when exposed to simulated lean-burn engine exhaust, of a degreened Fe/β-zeolite SCR catalyst, $L_{a0.9}S_{r0.1}CO_{O3}$ particles, and three degreened bi-functional catalyst materials each with a different $L_{a0.9}S_{r0.1}CO_{O3}$ particle loading.
Figure 12:
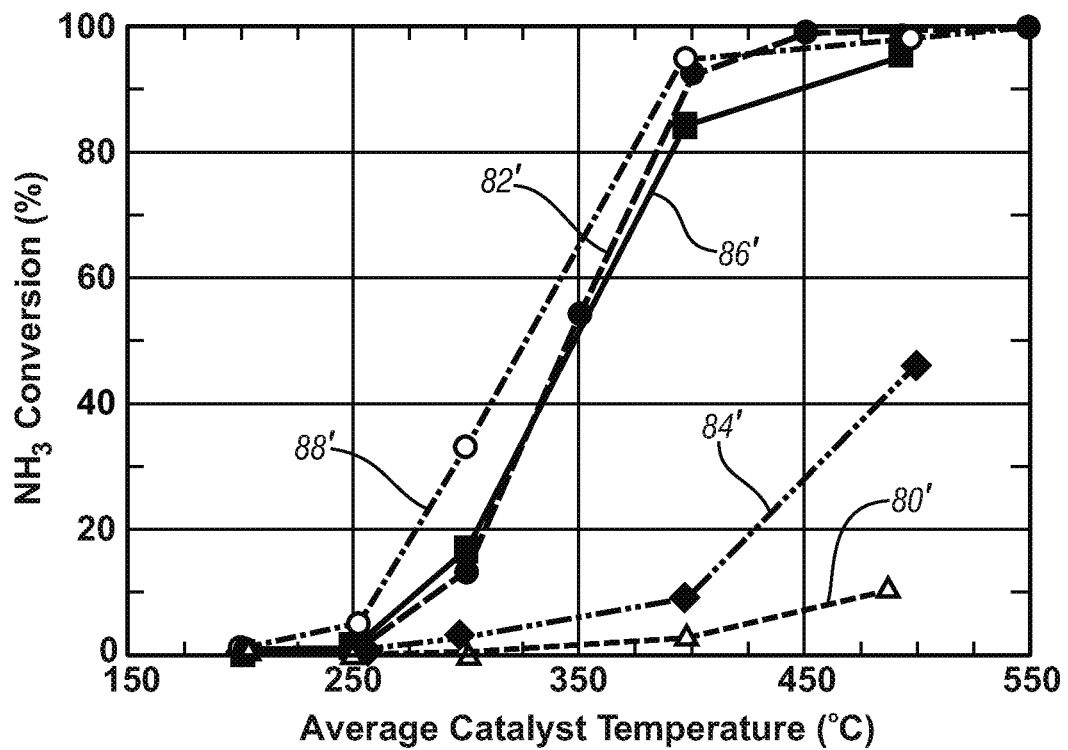
FIG. 12 is a graph that shows the $NH_3$ oxidation performance, when exposed to simulated lean-burn engine exhaust, of a high-temperature aged Fe/β-zeolite SCR catalyst, $La_{0.9}Sr_{0.1}CoO_3$ particles, and three high-temperature aged bi-functional catalyst materials each with a different $La_{0.9}Sr_{0.1}CoO_3$ particle loading.

FIGS. 11 and 12 show the $NH_3$ oxidation performance, in the absence of NO, of the Fe/β-zeolite SCR catalyst, the $La_{0.9}Sr_{0.1}CoO_3$ particles alone, and the bi-functional catalyst materials at temperatures ranging from 150° C. to 550° C. Temperature (° C.) is plotted on the X-axis and $NH_3$ conversion (%) is plotted on the Y-axis. The Fe/β-zeolite SCR catalyst and the bi-functional catalyst materials represented in FIG. 11 were degreened while the Fe/β-zeolite SCR catalyst and the bi-functional catalyst materials represented in FIG. 12 were high-temperature aged. The $La_{0.9}Sr_{0.1}CoO_3$ particles in both of FIGS. 11 and 12 were hydrothermally aged for 5 hours at 700° C. The simulated exhaust feedstream passed over the Fe/β-zeolite SCR catalyst and the bi-functional catalysts had a space velocity of about 30,000 $h^{-1}$ and comprised approximately 10% $O_2$, 5% $H_2O$, 5% $CO_2$, 200 ppm $NH_3$, and the balance $N_2$. The simulated exhaust feedstream passed over the $La_{0.9}Sr_{0.1}CoO_3$ particles had a space velocity of about 30,000 $h^{-1}$ and comprised 10% $O_2$, 400 ppm $NH_3$, and the balance $N_2$.

The $NH_3$ conversion of the Fe/β-zeolite SCR catalyst is identified by numeral 80 in FIG. 11 and numeral 80' in FIG. 12, the $NH_3$ conversion of the $La_{0.9}Sr_{0.1}CoO_3$ particles alone is identified by numeral 82 in FIG. 11 and numeral 82' in FIG. 12, the $NH_3$ conversion of the bi-functional catalyst material having 1.0 wt. % $La_{0.9}Sr_{0.1}CoO_3$ particles is identified as numeral 84 in FIG. 11 and numeral 84' in FIG. 12, the $NH_3$ conversion of the bi-functional catalyst material having 5.5 wt. % $La_{0.9}Sr_{0.1}CoO_3$ particles is identified as numeral 86 in FIG. 11 and numeral 86' in FIG. 12, and the $NH_3$ conversion of the bi-functional catalyst material having 12.0 wt. % $La_{0.9}Sr_{0.1}CoO_3$ particles is identified as numeral 88 in FIG. 11 and numeral 88' in FIG. 12.

As shown in FIGS. 11 and 12, the degreened bi-functional catalyst materials having a 5.5 wt. % and 12 wt. % $La_{0.9}Sr_{0.1}CoO_3$ particle loading (FIG. 11) oxidized $NH_3$ more effectively than the $La_{0.9}Sr_{0.1}CoO_3$ particles alone while the high-temperature aged bi-functional catalyst materials with the same $La_{0.9}Sr_{0.1}CoO_3$ particles loadings (FIG. 12) oxidized $NH_3$ quite comparably to the $La_{0.9}Sr_{0.1}CoO_3$ particles alone. The bi-functional catalyst materials having a 1.0 wt. % $La_{0.9}Sr_{0.1}CoO_3$ particle loading—both degreened and high-temperature aged—and the Fe/β-zeolite SCR catalyst oxidized $NH_3$ to a lesser extent.

Figure 13:
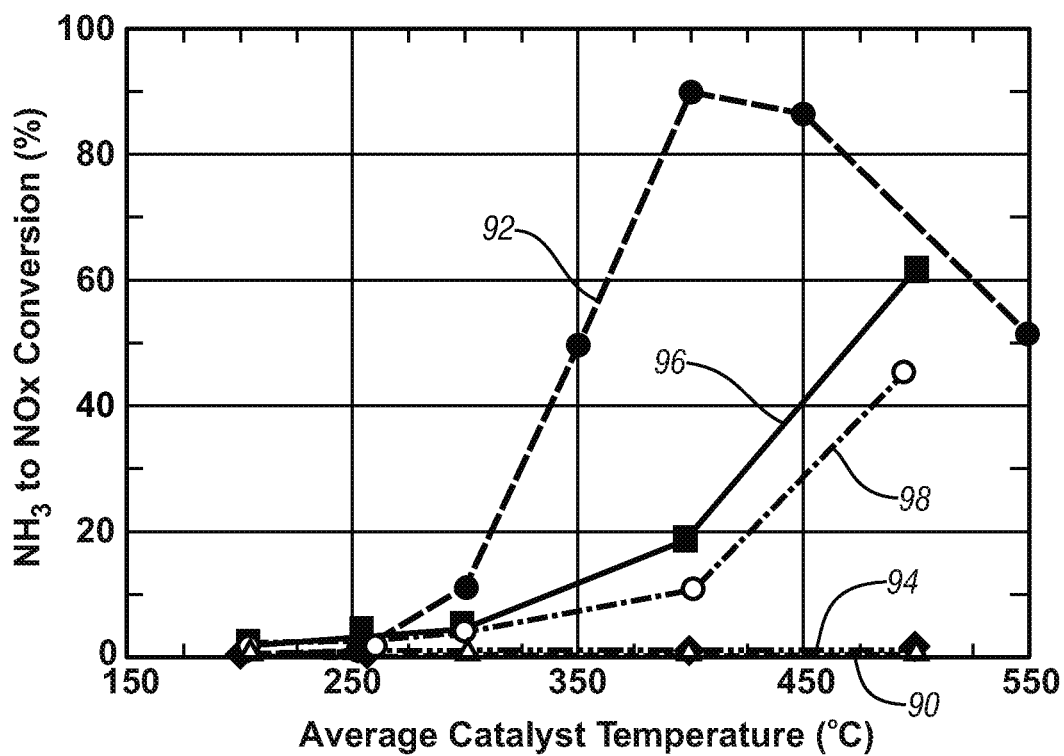
FIG. 13 is a graph that shows how much of the $NH_3$ oxidation shown in FIG. 11 resulted in the formation of $NO_X$.
Figure 14:
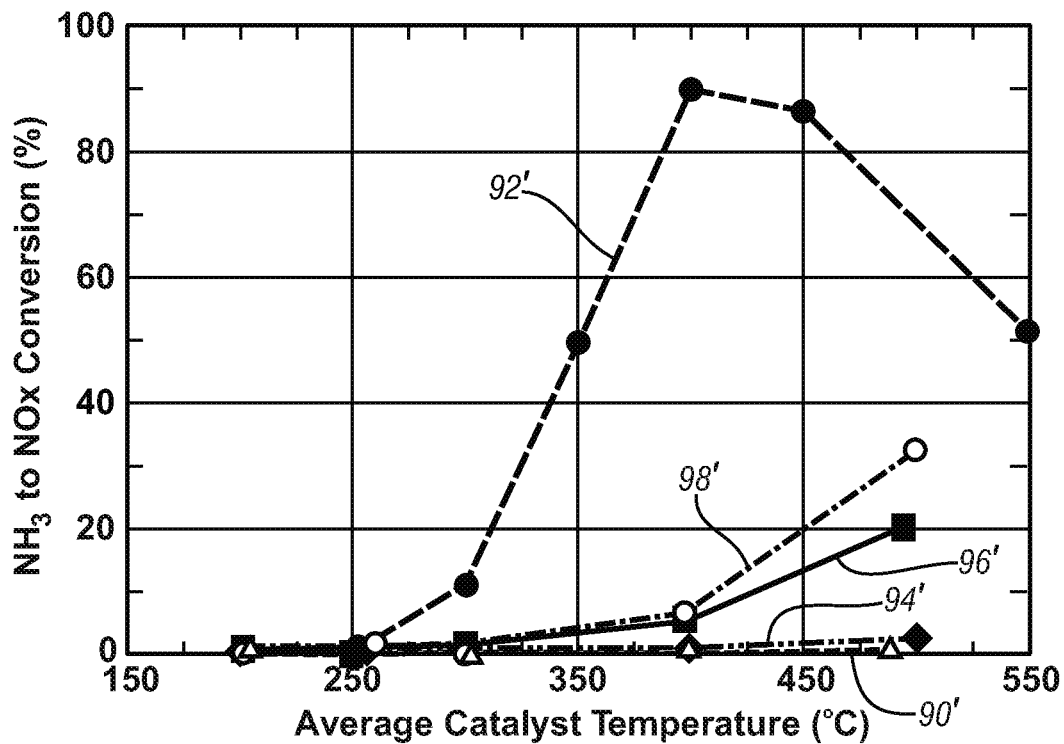
FIG. 14 is a graph that shows how much of the $NH_3$ oxidation shown in FIG. 12 resulted in the formation of $NO_X$.

FIGS. 13 and 14 are related to FIGS. 11 and 12, respectively, and show how much of the oxidized $NH_3$ formed $NO_X$. Temperature (° C.) is plotted on the X-axis and $NO_X$ selectivity (%)—that is, the conversion of $NH_3$ to $NO_X$—is plotted on the Y-axis. The Fe/β-zeolite SCR catalyst and the bi-functional catalyst materials represented in FIG. 13 were degreened while the Fe/β-zeolite SCR catalyst and the bi-functional catalyst materials represented in FIG. 14 were high-temperature aged. The $La_{0.9}Sr_{0.1}CoO_3$ particles in both of FIGS. 13 and 14 were hydrothermally aged for 5 hours at 700° C.

The $NO_X$ selectivity of the Fe/β-zeolite SCR catalyst is identified by numeral 90 in FIG. 13 and numeral 90' in FIG. 14, the $NO_X$ selectivity of the $La_{0.9}Sr_{0.1}CoO_3$ particles alone is identified by numeral 92 in FIG. 13 and numeral 92' in FIG. 14, the $NO_X$ selectivity of the bi-functional catalyst material having 1.0 wt. % $La_{0.9}Sr_{0.1}CoO_3$ particles is identified as numeral 94 in FIG. 13 and numeral 94' in FIG. 14, the NO selectivity of the bi-functional catalyst material having 5.5 wt. % $La_{0.9}Sr_{0.1}CoO_3$ particles is identified as numeral 96 in FIG. 13 and numeral 96' in FIG. 14, and the $NO_X$ selectivity of the bi-functional catalyst material having 12.0 wt. % $La_{0.9}Sr_{0.1}CoO_3$ particles is identified as numeral 98 in FIG. 13 and numeral 98' in FIG. 14.

As shown, the $La_{0.9}Sr_{0.1}CoO_3$ particles alone oxidized $NH_3$ to $NO_X$ quite readily at temperatures above about 300° C. while the Fe/β-zeolite SCR catalyst—both degreened and high-temperature aged—produced essentially no $NO_X$. The degreened and the high-temperature aged bi-functional catalyst materials having a 1.0 wt. % $La_{0.9}Sr_{0.1}CoO_3$ particle loading also generated very little $NO_X$, if any. The degreened and the high-temperature aged bi-functional catalyst materials with 5.5 wt. % and 12 wt. % $La_{0.9}Sr_{0.1}CoO_3$ particle loadings, however, showed an uptick in $NO_X$ selectivity once temperatures eclipsed about 400° C. This increase in $NO_X$ selectivity was less pronounced for the high-temperature aged 5.5 wt. % and 12 wt. % $La_{0.9}Sr_{0.1}CoO_3$ particle loaded bi-functional catalyst materials than for the corresponding degreened bi-functional catalyst materials.

Figure 15:
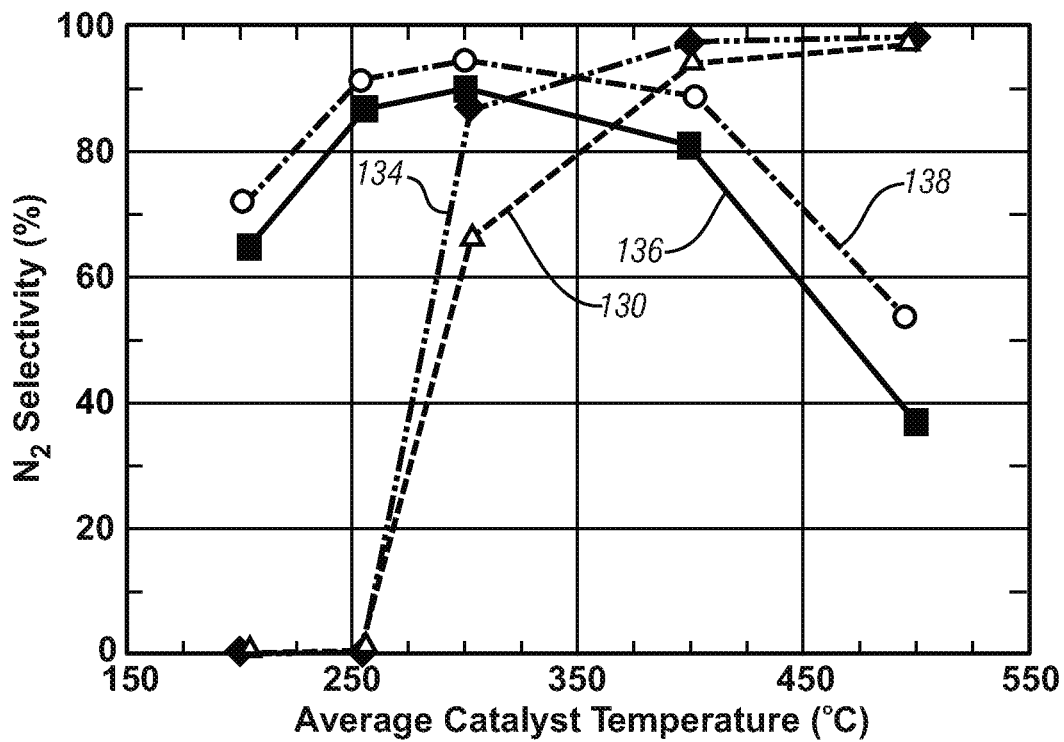
FIG. 15 is a graph that shows how much of the $NH_3$ oxidation shown in FIG. 11 resulted in the formation of $N_2$.
Figure 16:
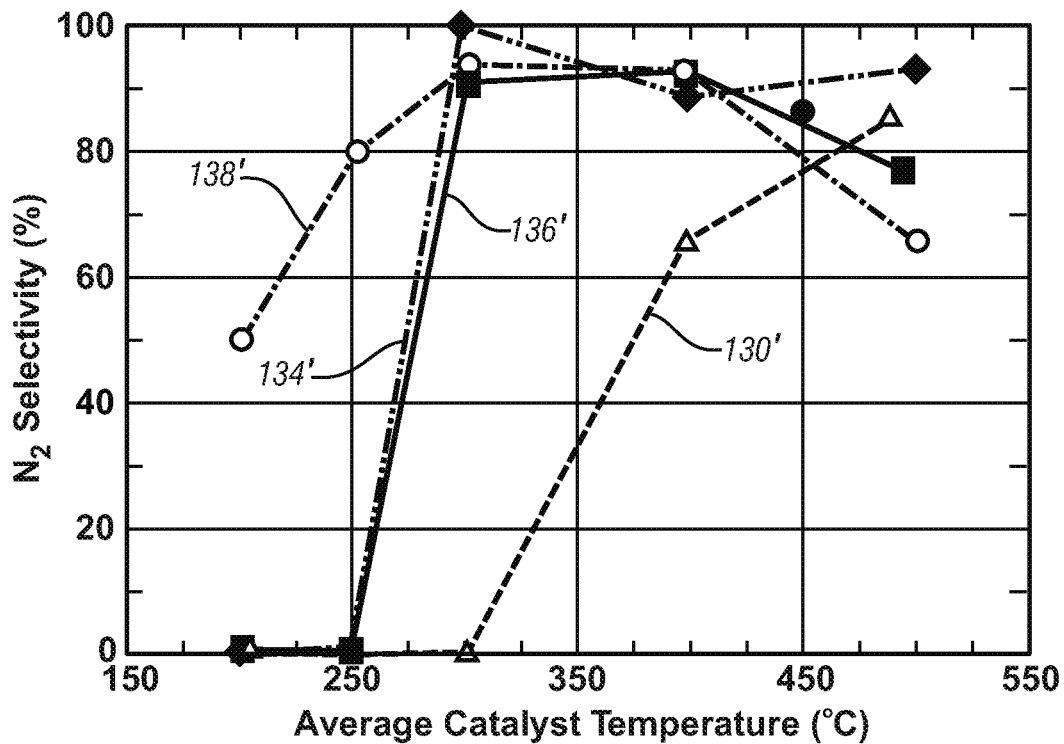
FIG. 16 is a graph that shows how much of the $NH_3$ oxidation shown in FIG. 12 resulted in the formation of $N_2$.

FIGS. 15 and 16 are related to FIGS. 11-14 and show how much of the oxidized $NH_3$ formed $N_2$. Temperature (° C.) is plotted on the X-axis and $N_2$ selectivity (%)—that is, the conversion of $NH_3$ to $N_2$—is plotted on the Y-axis. The Fe/β-zeolite SCR catalyst and the bi-functional catalyst materials represented in FIG. 15 were degreened while the Fe/β-zeolite SCR catalyst and the bi-functional catalyst materials represented in FIG. 16 were high-temperature aged.

The $NO_X$ selectivity of the Fe/β-zeolite SCR catalyst is identified by numeral 130 in FIG. 15 and numeral 130' in FIG. 16, the $N_2$ selectivity of the bi-functional catalyst material having 1.0 wt. % $La_{0.9}Sr_{0.1}CoO_3$ particles is identified as numeral 134 in FIG. 15 and numeral 134' in FIG. 16, the $N_2$ selectivity of the bi-functional catalyst material having 5.5 wt. % $La_{0.9}Sr_{0.1}CoO_3$ particles is identified as numeral 136 in FIG. 15 and numeral 136' in FIG. 16, and the $N_2$ selectivity of the bi-functional catalyst material having 12.0 wt. % $La_{0.9}Sr_{0.1}CoO_3$ particles is identified as numeral 138 in FIG. 15 and numeral 138' in FIG. 16.

As shown, the 1 wt. % $La_{0.9}Sr_{0.1}CoO_3$ particle loaded bi-functional catalyst material showed the best $N_2$ selectivity once catalyst light-off occurred (about 250° C.) regardless of aging. The $N_2$ selectivity of each high-temperature aged bi-functional catalyst material, moreover, was approximately the same in the temperature range of about 300° C. to about 450° C. as shown in FIG. 16.

Figure 17:
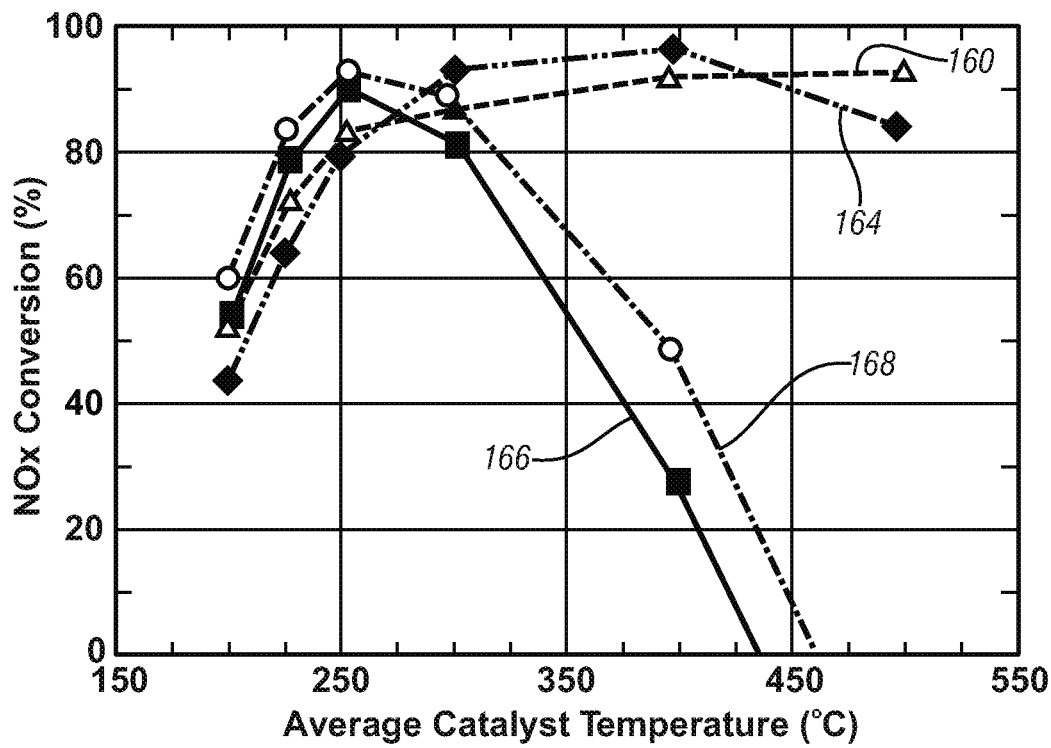
FIG. 17 is a graph that shows the $NO_X$ conversion performance, when exposed to simulated lean-burn engine exhaust, of a degreened Fe/β-zeolite SCR catalyst and three degreened bi-functional catalyst materials each with a different $La_{0.9}Sr_{0.1}CoO_3$ particle loading.
Figure 18:
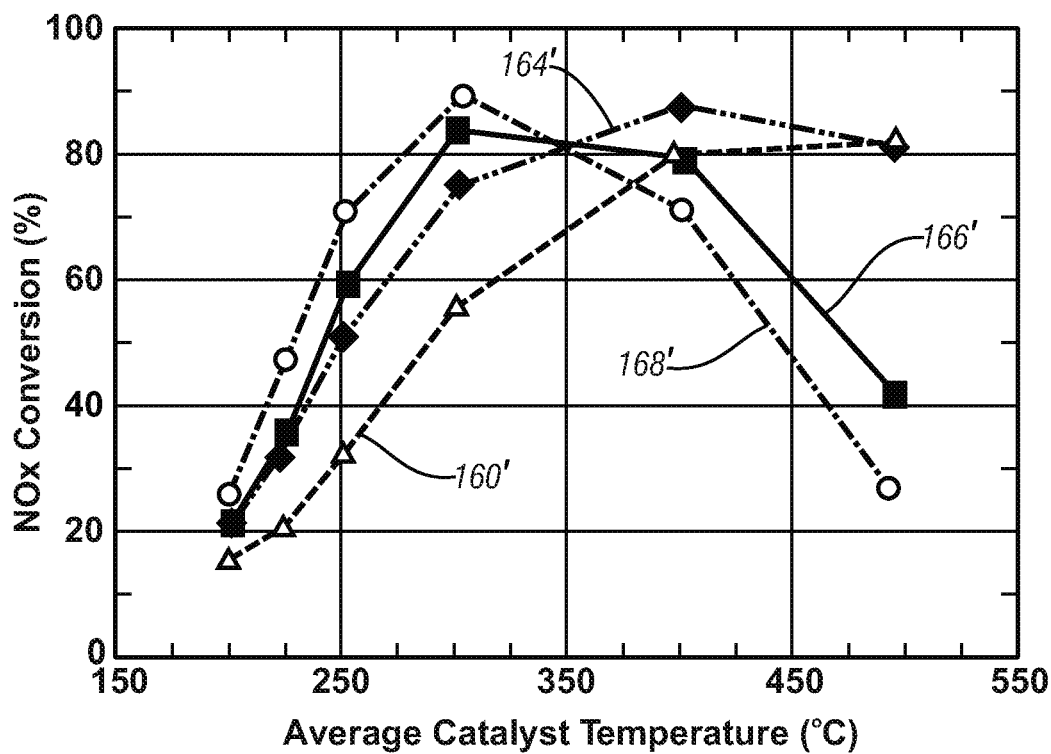
FIG. 18 is a graph that shows the $NO_X$ conversion performance, when exposed to simulated lean-burn engine exhaust, of a high-temperature aged Fe/β-zeolite SCR catalyst and three high-temperature aged bi-functional catalyst materials each with a different $L_{a0.9}S_{r0.1}CO_{O3}$ particle loading.

FIGS. 17 and 18 show the $NO_X$ conversion performance of the Fe/β-zeolite SCR catalyst and the three bi-functional catalyst materials at temperatures ranging from 150° C. to 550° C. Temperature (° C.) is plotted on the X-axis and $NO_X$ conversion (%) is plotted on the Y-axis. The Fe/β-zeolite SCR catalyst and the bi-functional catalyst materials represented in FIG. 17 were degreened while the Fe/β-zeolite SCR catalyst and the bi-functional catalyst materials represented in FIG. 18 were high-temperature aged. The simulated exhaust feedstream passed over the Fe/β-zeolite SCR catalyst and the three bi-functional catalyst materials had a space velocity of about 30,000 $h^{-1}$ and comprised approximately 10% $O_2$, 5% $H_2O$, 5% $CO_2$, 200 ppm NO, 200 ppm $NH_3$, and the balance $N_2$.

The $NO_X$ conversion of the Fe/β-zeolite SCR catalyst is identified by numeral 160 in FIG. 17 and numeral 160' in FIG. 18, the $NO_X$ conversion of the bi-functional catalyst material having 1.0 wt. % $La_{0.9}Sr_{0.1}CoO_3$ particles is identified as numeral 164 in FIG. 17 and numeral 164' in FIG. 18, the $NO_X$ conversion of the bi-functional catalyst material having 5.5 wt. % $La_{0.9}Sr_{0.1}CoO_3$ particles is identified as numeral 166 in FIG. 17 and numeral 166' in FIG. 18, and the $NO_X$ conversion of the bi-functional catalyst material having 12.0 wt. % $La_{0.9}Sr_{0.1}CoO_3$ particles is identified as numeral 168 in FIG. 17 and numeral 168' in FIG. 18.

As shown in FIG. 17, all three of the degreened bi-functional catalyst materials converted $NO_X$ to $N_2$ quite similarly at temperatures up to about 250° C. But the $NO_X$ conversion efficiency of the three degreened bi-functional catalyst materials began to differ once the catalyst temperature reached about 300° C. At that temperature, the $NO_X$ conversion efficiency of the 5.5 wt. % and the 12 wt. % $La_{0.9}Sr_{0.1}CoO_3$ particle loaded bi-functional catalyst materials began to quickly decrease while that of the 1 wt. % $La_{0.9}Sr_{0.1}CoO_3$ particle loaded bi-functional catalyst material remained high. As shown in FIG. 18, the differences in the $NO_X$ conversion efficiency of the three high-temperature aged bi-functional catalyst materials became less divergent. The $NO_X$ conversion efficiency data does, however, suggest that lower $La_{0.9}Sr_{0.1}CoO_3$ particle loadings generally convert $NO_X$ more efficiently at higher temperatures (above about 350° C.) while higher $La_{0.9}Sr_{0.1}CoO_3$ particle loadings generally convert $NO_X$ more efficiently at lower temperatures (below about 350° C.).

The above description of embodiments is merely exemplary in nature and, thus, variations thereof are not to be regarded as a departure from the spirit and scope of the invention.

What is claimed is:

1. A bi-functional catalyst material comprising:
    a selective catalytic reduction catalyst that facilitates the reduction of $NO_x$ to $N_2$ when exposed to an exhaust mixture that comprises a reductant and an exhaust flow produced by a lean-burn engine that is combusting a lean-mixture of air and fuel; and
    metal oxide particles selected from the group consisting of perovskite oxide particles and manganese-containing mixed metal oxide particles dispersed on the selective catalytic reduction catalyst in an amount that ranges from about 0.1 wt. % to about 20 wt. % based on the weight of the bi-functional catalyst material.

2. The bifunctional catalyst material set forth in claim 1, wherein the perovskite oxide particles comprise at least one of $LaCoO_3$, $La_{0.9}Sr_{0.1}CoO_3$, $LaMnO_3$, $La_{0.9}Sr_{0.1}MnO_3$, $LaFeO_3$, or $LaSr_{0.1}Fe_{0.9}O_3$, and wherein the manganese-containing mixed metal oxide particles comprise at least one of $Mn_XCe_YO_Z$, $Mn_XZr_WO_Z$, or $Mn_XCe_YZr_WO_Z$ in which X ranges from 0.02 to 0.98, Y ranges from 0.02 to 0.98, W ranges from 0.02 to 0.98, and Z ranges from 1.0 to 3.0.

3. The bi-functional catalyst material set forth in claim 1, wherein the selective catalytic reduction catalyst comprises at least one of an ion-exchanged base-metal zeolite, silver-supported alumina, or a base metal oxide.

4. The bi-functional catalyst material set forth in claim 3, wherein the selective catalytic reduction catalyst comprises at least one of a 13-zeolite that is ion-exchanged with at least one of Cu or Fe, an MFI-type zeolite that is ion-exchanged with at least one of Cu or Fe, a Y-zeolite that is ion-exchanged with at least one of Na, Ba, Cu, Co, or CuCo, or a base metal oxide that comprises at least one of $V_2O_5$—$WO_3/TiO_2$ or $V_2O_5/TiO_2$.

5. The bi-functional catalyst material set forth in claim 1, wherein the amount of metal oxide particles dispersed on the selective catalytic reduction catalyst ranges from about 0.5 wt. % to about 15 wt. % based on the weight of the bi-functional catalyst material.

6. The bi-functional catalyst material set forth in claim 1, wherein the amount of metal oxide particles dispersed on the selective catalytic reduction catalyst ranges from about 1.0 wt. % to about 12 wt. % based on the weight of the bi-functional catalyst material.

7. An exhaust aftertreatment system for removing gaseous emissions and suspended particulate matter, if present, contained in exhaust produced by a lean-burn engine that is combusting a lean mixture of air and fuel, the exhaust aftertreatment system comprising:
    a SCR converter that receives an exhaust mixture, the exhaust mixture comprising a reductant mixed with an exhaust flow from a lean-burn engine, the exhaust mixture comprising $NO_X$ comprising NO and $NO_2$ in a molar ratio that ranges from about 4 to about 19 and that is substantially the same as a molar ratio of NO to $NO_2$ produced by the combustion of the lean mixture of air and fuel in the lean-burn engine, the SCR converter comprising a bi-functional catalyst material that comprises (1) a selective catalytic reduction catalyst that facilitates the reduction of $NO_X$ to $N_2$ when exposed to the exhaust mixture and (2) metal oxide particles selected from the group consisting of perovskite oxide particles and manganese-containing mixed metal oxide particles dispersed on the selective catalytic reduction catalyst in an amount that ranges from about 0.1 wt. % to about 20 wt. % based on the weight of the bi-functional catalyst material.

8. The exhaust aftertreatment system set forth in claim 7, wherein the perovskite oxide particles comprise at least one of $LaCoO_3$, $La_{0.9}Sr_{0.1}CoO_3$, $LaMnO_3$, $La_{0.9}Sr_{0.1}MnO_3$, $LaFeO_3$, or $LaSr_{0.1}Fe_{0.9}O_3$, and wherein the manganese-containing mixed metal oxide particles comprise at least one of $Mn_XCe_YO_Z$, $Mn_XZr_WO_Z$, or $Mn_XCe_YZr_WO_Z$ in which X ranges from 0.02 to 0.98, Y ranges from 0.02 to 0.98, W ranges from 0.02 to 0.98, and Z ranges from 1.0 to 3.0.

9. The exhaust aftertreatment system set forth in claim 7, wherein the reductant in the exhaust mixture is ammonia, and wherein the selective catalytic reduction catalyst comprises at least one of a β-zeolite that is ion-exchanged with at least one of Cu or Fe, a MFI-type zeolite that is ion-exchanged with at least one of Cu or Fe, or a base metal oxide that comprises at least one of $V_2O_5/WO_3$ or $V_2O_5/TiO_2$.

10. The exhaust aftertreatment system set forth in claim 7, wherein the reductant in the exhaust mixture is a hydrocarbon or an oxygenated hydrocarbon, and wherein the selective catalytic reduction catalyst comprises at least one of silver-supported alumina or a Y-zeolite that is ion-exchanged with at least one of Na, Ba, Cu, Co, or CuCo.

11. The exhaust aftertreatment system set forth in claim 7, further comprising a diesel oxidation converter located downstream of the SCR converter, wherein the diesel oxidation converter comprises a diesel oxidation catalyst that does not include platinum.

12. The exhaust aftertreatment system set forth in claim 7, further comprising a diesel oxidation converter located upstream of the SCR converter, wherein the diesel oxidation converter comprises a diesel oxidation catalyst that does not include platinum or includes platinum in such a small amount that the diesel oxidation catalyst does not substantially reduce the molar ratio NO to $NO_2$ in the exhaust mixture from the NO to $NO_2$ molar ratio produced by the combustion of the lean mixture of air and fuel in the lean-burn engine.

13. The exhaust aftertreatment system set forth in claim 7, further comprising a catalytic converter located either upstream or downstream of the SCR converter, wherein the catalytic converter comprises a three-way-catalyst.

14. The exhaust aftertreatment system set forth in claim 7, further comprising a reductant storage tank that stores the reductant and a reductant injector in fluid communication with the reductant storage tank that is operable to inject the reductant into the exhaust flow to form the exhaust mixture.

* * * * *